(12) United States Patent
Hwang

(10) Patent No.: US 12,574,889 B2
(45) Date of Patent: Mar. 10, 2026

(54) METHOD AND DEVICE FOR POSITIONING IN WIRELESS COMMUNICATION SYSTEM

(71) Applicant: Samsung Electronics Co., Ltd., Suwon-si (KR)

(72) Inventor: June Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 18/272,498

(22) PCT Filed: Jan. 5, 2022

(86) PCT No.: PCT/KR2022/000167
§ 371 (c)(1),
(2) Date: Jul. 14, 2023

(87) PCT Pub. No.: WO2022/154365
PCT Pub. Date: Jul. 21, 2022

(65) Prior Publication Data
US 2024/0205869 A1 Jun. 20, 2024

(30) Foreign Application Priority Data
Jan. 14, 2021 (KR) .................. KR10-2021-0005263

(51) Int. Cl.
*H04W 64/00* (2009.01)
*H04W 24/10* (2009.01)
(52) U.S. Cl.
CPC ........... *H04W 64/00* (2013.01); *H04W 24/10* (2013.01)
(58) Field of Classification Search
None
See application file for complete search history.

(56) References Cited

U.S. PATENT DOCUMENTS

| | | |
|---|---|---|
| 9,446,520 B2 | 9/2016 | Altman et al. |
| 2014/0094188 A1 | 4/2014 | Kazmi et al. |
| 2020/0351621 A1 | 11/2020 | Kumar et al. |
| 2022/0052828 A1 * | 2/2022 | Yiu ........................ H04L 5/0098 |
| 2022/0124664 A1 * | 4/2022 | Cha ........................ H04W 64/00 |

(Continued)

FOREIGN PATENT DOCUMENTS

| | | |
|---|---|---|
| KR | 10-0974022 B1 | 11/2010 |
| KR | 10-2020-0135271 A | 12/2020 |

OTHER PUBLICATIONS

3GPP TSG-RAN WG2 Meeting #112, Draft R2-2009001 (Year: 2020).*
Huawei et al, Considerations on DL procedures for NR positioning, 3GPP TSG-RAN WG2 Meeting #108, R2-1914980, Nov. 8, 2019, Reno, USA.
Moderator (Intel Corporation, CATT, Ericsson), Outcome of RAN WG1 E-mail Discussion, 3GPP TSG RAN WG1 Meeting #102-E, R1-2007486, e-Meeting, Oct. 24, 2020.

(Continued)

*Primary Examiner* — Adolf Dsouza
(74) *Attorney, Agent, or Firm* — Jefferson IP Law, LLP

(57) ABSTRACT

A method performed by a base station in a wireless communication system is provided. The method includes receiving, from a location management function (LMF) entity, an NR positioning protocol A (NRPPa) message, determining measurement gap configuration information, based on the NRPPa message, transmitting, to a user equipment (UE), a radio resource control (RRC) reconfiguration message including the measurement gap configuration information, and performing a measurement gap activation procedure, based on the measurement gap configuration information.

12 Claims, 19 Drawing Sheets

(56)          References Cited

U.S. PATENT DOCUMENTS

| | | | | |
|---|---|---|---|---|
| 2023/0079502 A1* | 3/2023 | Cha | H04W 64/00 | 370/252 |
| 2023/0152413 A1* | 5/2023 | Kim | H04L 5/0051 | 370/329 |
| 2023/0171714 A1* | 6/2023 | Oh | H04W 40/18 | 370/330 |
| 2023/0171793 A1* | 6/2023 | Kim | H04L 5/0055 | 370/329 |
| 2023/0198708 A1* | 6/2023 | Hong | H04L 5/0094 | 370/329 |
| 2023/0254838 A1* | 8/2023 | Kim | H04W 72/12 | 370/329 |
| 2023/0262649 A1* | 8/2023 | Si | H04W 64/00 | |
| 2023/0362699 A1* | 11/2023 | Yerramalli | H04W 24/10 | |
| 2024/0414683 A1* | 12/2024 | Khoryaev | G01S 5/0036 | |

OTHER PUBLICATIONS

European Notice of Allowance dated Dec. 19, 2024, issued in European Patent Application No. 22739563.9.

Extended European Search Report dated May 15, 2024, issued in European Patent Application No. 22739563.9.

Intel Corporation, Report of [Post111-e][625][POS] End-to-end latency analysis (Intel), 3GPP TSG-RAN WG2 Meeting #112 electronic, Draft R2-2009001, Oct. 23, 2020.

Intel Corporation, Evaluation Results for NR Positioning Performance in I-IoT Scenarios, 3GPP TSG RAN WG1 #103- e, R1-2007945, Nov. 1, 2020.

Moderator (Huawei), Summary #1 of [107-e-NR-ePos-04] latency improvements, 3GPP TSG-RAN WG1 Meeting #107-e, R1-2112457, Nov. 15, 2021.

* cited by examiner

METHOD AND DEVICE FOR POSITIONING IN WIRELESS COMMUNICATION SYSTEM

CROSS-REFERENCE TO RELATED APPLICATION(S)

This application is a U.S. National Stage application under 35 U.S.C. § 371 of an International application number PCT/KR2022/000167, filed on Jan. 5, 2022, which is based on and claimed priority of a Korean patent application number 10-2021-0005263, filed on Jan. 14, 2021, in the Korean Intellectual Property Office, the disclosure of which is incorporated by reference herein in its entirety.

TECHNICAL FIELD

The present disclosure generally relates to a wireless communication system, and more particularly, to an apparatus and method of localizing a position of a user equipment (UE) in a wireless communication system.

BACKGROUND ART

In order to satisfy increasing demand with respect to wireless data traffic due to the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems.

In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

In order to improve performance of system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (COMP), and received-interference cancellation have been developed.

In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

As a user equipment (UE) may move in a wireless communication system, there may be a demand for a mobility management of the UE so as to provide the terminal with an appropriate quality service. As a part of the mobility management, there may be a demand for localization of a position of the UE.

DISCLOSURE

Technical Solution

The present disclosure provides an apparatus and method of localizing a position of a user equipment (UE) in a wireless communication system.

An embodiment provides an apparatus and method of decreasing latency due to a measurement gap occurring when a UE attempts to transmit measured position related information to a base station (BS).

An embodiment provides an apparatus and method of decreasing latency due to obtainment of a transmit resource when a UE attempts to transmit measured position related information to a BS.

MODE FOR INVENTION

Figure 1:
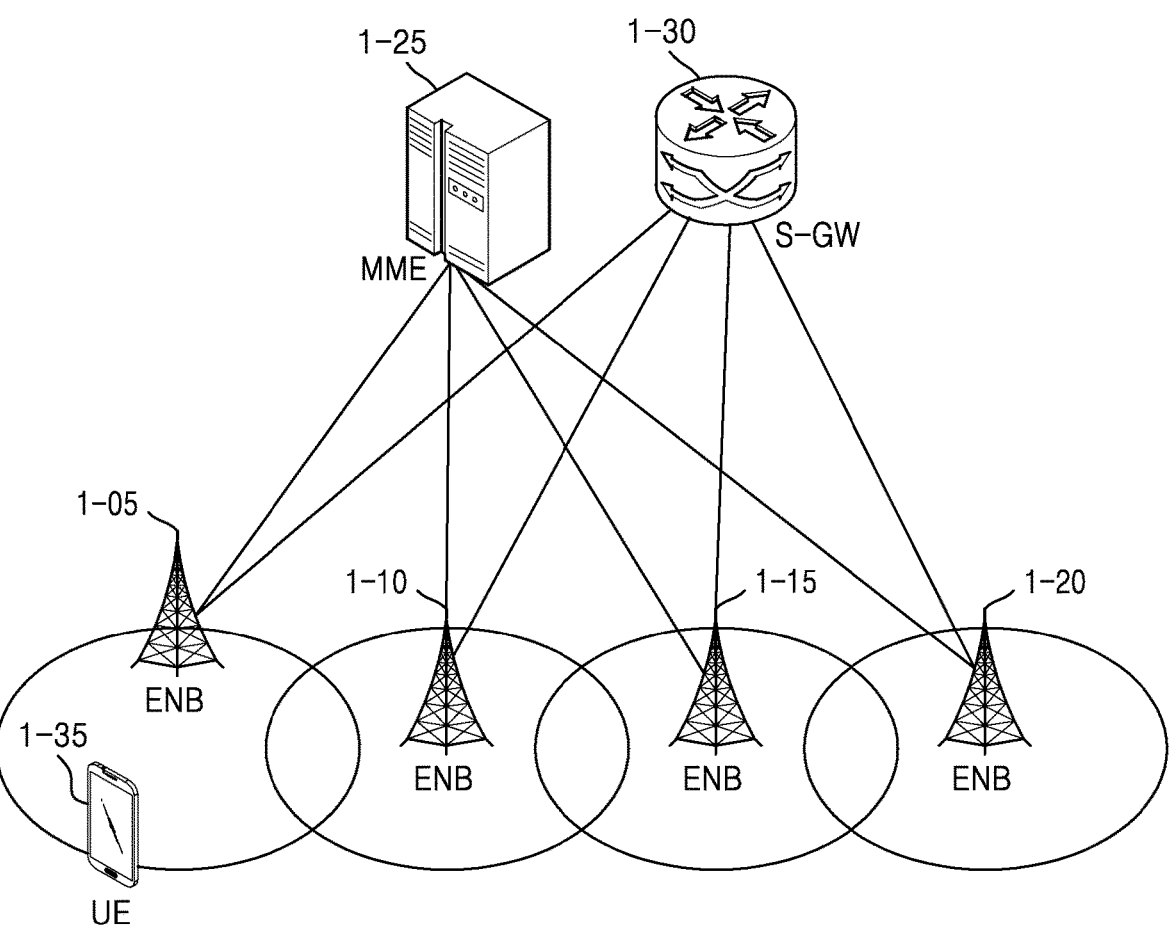
FIG. 1 is a diagram illustrating an architecture of a long term evolution (LTE) system according to an embodiment of the present disclosure.

Advantages and features of the present disclosure and methods of accomplishing the same may be understood more readily by reference to the following detailed descriptions of embodiments and accompanying drawings. However, the present disclosure may be embodied in many different forms and should not be construed as being limited to the embodiments set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

Here, it will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed by the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment, refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments.

In the description of the present disclosure, detailed descriptions of the related art are omitted when it is deemed that they may unnecessarily obscure the essence of the present disclosure. Hereinafter, embodiments of the present disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the present disclosure is not limited to the terms to be described below, and other terms indicating objects having equal technical meanings may be used.

For convenience of descriptions, in the present disclosure, terms and names or modifications of the terms and names defined in the 3$^{rd}$ Generation Partnership Project Long Term Evolution (3GPP LTE) standard are used. However, the present disclosure is not limited to the terms and names, and may also be applied to systems following other standards. In the present disclosure, an evolved node B (eNB) may be interchangeably used with a next-generation node B (gNB) for convenience of descriptions. That is, a base station (BS)

described by an eNB may represent a gNB. Also, the term "terminals" may refer to not only mobile phones, narrowband Internet of Things (NB-IoT) devices, and sensors but also other wireless communication devices.

Hereinafter, a base station is an entity that allocates resources to a terminal, and may be at least one of a gNode B, an eNode B, a Node B, a BS, a radio access unit, a BS controller, or a node on a network. A terminal may include a user equipment (UE), a mobile station (MS), a cellular phone, a smartphone, a computer, or a multimedia system capable of performing a communication function. However, the present disclosure is not limited to the above example.

In particular, the present disclosure may be applied to 3GPP NR (5th generation mobile communication standards). Also, the present disclosure is applicable to intelligent services (e.g., smart home, smart building, smart city, smart car or connected car, health care, digital education, retail, security, and safety services) based on 5G communication technology and Internet of things (IoT) technology. In the present disclosure, an eNB may be interchangeably used with a gNB for convenience of descriptions. That is, a BS described by an eNB may represent a gNB. Also, the term "terminals" may refer to not only mobile phones, narrowband NB-IoT devices, and sensors but also other wireless communication devices.

Wireless communication systems that provided voice-based services in the early stages are now being developed to be broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an eNB or a BS), and the DL refers to a radio link for transmitting data or a control signal from the base station to the terminal. The above-described multiple access schemes identify data or control information of each user in a manner that time-frequency resources for carrying the data or control information of each user are allocated and managed not to overlap each other, that is, to achieve orthogonality therebetween.

As post-LTE communication systems, that is, the 5G communication systems, need to support services capable of freely reflecting and simultaneously satisfying various requirements of users, service providers, and the like. For example, services considered for the 5G communication systems include enhanced mobile broadband (eMBB), massive machine-type communication (mMTC), ultra-reliability low-latency communication (URLLC) services, or the like.

According to some embodiments, the eMBB aims to provide an improved data rate than a data rate supported by the legacy LTE, LTE-A, or LTE-Pro. For example, in a 5G communication system, the eMBB should be able to provide a peak data rate of 20 Gbps in a DL and a peak data rate of 10 Gbps in an UL at one BS. Also, the 5G communication system may have to simultaneously provide the peak data rate and an increased user-perceived data rate of a terminal. In order to satisfy such requirements, the 5G communication system may request improvement in various transmission/reception technologies including an improved multiple-input multiple-output (MIMO) transmission technology. Also, a data rate required in the 5G communication system may be satisfied by using a frequency bandwidth wider than 20 MHz in the 3 GHz to 6 GHz or 6 GHz or more frequency band, instead of the legacy LTE transmitting a signal by using maximum 20 MHz in the 2 GHz band.

Simultaneously, the mMTC is being considered to support application services such as IoT in 5G communication systems. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery life time of 10 to 15 years because it is difficult to frequently replace the battery of the terminal.

Lastly, the URLLC refers to cellular-based wireless communication services used for mission-critical purposes such as services for remote control of robots or machinery, industrial automation, unmanned aerial vehicles, remote health care, emergency alerts, and the like. Therefore, the URLLC should provide communications providing very low latency (ultra-low latency) and very high reliability (ultra reliability). For example, a service supporting the URLLC should satisfy air interface latency of less than 0.5 milliseconds, and simultaneously has a requirement for a packet error rate of 10-5 or less. Thus, for the service supporting the URLLC, the 5G system should provide a transmit time interval (TTI) smaller than other services and may simultaneously have a design requirement for allocating wide resources in a frequency band so as to achieve reliability of a communication link.

The three services of the eMBB, the URLLC, and the mMTC which are considered in the 5G communication system may be multiplexed and transmitted in one system. Here, in order to satisfy different requirements of the services, the services may use different transceiving schemes and different transceiving parameters. However, the above-described mMTC, URLLC, and eMBB services are merely examples and the types of services to which the present disclosure is applicable are not limited thereto.

Although LTE, LTE-A, LTE Pro, or 5G (or NR) systems are mentioned as examples in the following description, embodiments of the present disclosure may also be applied to other communication systems having similar technical backgrounds or channel types. Furthermore, the embodiments of the present disclosure may also be applied to other communication systems through partial modification without greatly departing from the scope of the present disclosure based on determination by one of ordinary skill in the art.

Hereinafter, operational principles of the present disclosure will be described in detail with reference to accompanying drawings. In the description of the present disclosure, detailed descriptions of the related art are omitted when it is deemed that they may unnecessarily obscure the essence of the present disclosure. The terms used in the specification are defined in consideration of functions used in the present disclosure, and can be changed according to the intent or commonly used methods of users or operators. Accordingly, definitions of the terms are understood based on the entire description of the present specification.

According to an embodiment of the present disclosure, provided is a method performed by a BS in a wireless communication system, the method including receiving, from a network, positioning reference signal (PRS) configuration information associated with a reference cell and at least one neighboring cell with respect to a UE, transmitting, to the UE, information about identifiers respectively corresponding to measurement gap candidates determined based on the PRS configuration information, requesting the UE for position measurement; receiving information about a measurement gap from the UE, based on the position measurement, and determining, based on the measurement gap, a measurement gap associated with the UE from among the measurement gap candidates, and transmitting, to the UE, information about an identifier corresponding to the determined measurement gap.

According to an embodiment of the present disclosure, a method performed by a UE in a wireless communication system includes receiving configured grant (CG) configuration information from a BS, receiving a position measurement request from the BS after identifying a resource for uplink data transmission, based on the CG configuration information, performing a position measurement operation, based on the position measurement request; and transmitting, to the BS, information about a result of the position measurement operation, by using the resource for uplink data transmission.

According to various embodiments of the present disclosure, an operating method of a UE in a wireless communication system may include receiving, via assistance information, PRS configuration information associated with a reference cell and at least one neighboring cell with respect to the UE, receiving a message for requesting PRS measurement, in correspondence to reception of the message, comparing a measurement object time and a measurement target frequency that is currently operated by the UE with a measurement object time and a measurement target frequency on the received PRS configuration information, and when the UE has to perform measurement exceeding a capacity of the UE, requesting a BS for a measurement gap, and receiving configuration of a specific measurement gap from the BS, measuring a PRS during the measurement gap and reporting a result thereof to the BS.

In this procedure, a location management function (LMF) of a wireless communication system may transfer time and frequency information of a PRS to be used in measurement to a serving BS of the UE, and the serving BS having received the information may previously allocate a plurality of identifiers (IDs) to measurement gaps and transfer them to the UE, based on the information. When the UE requests a measurement gap after the UE receives the ID, the serving BS may select one of the given IDs and may indicate the UE by using a control signal of a physical (PHY) layer or a medium access control (MAC) layer. In this procedure, the LMF of the wireless communication system may transfer requested measurement reporting delay time information to the serving BS of the UE, and the serving BS having received the information may transfer configured uplink resource grant to the UE, based on the information. As the configured uplink resource grant is semi-statically and periodically pre-allocated, when a PRS measurement result occurs, the UE may transfer a measurement result to the LMF at an available configured uplink resource grant time without a procedure of receiving dynamic allocation of UL grant.

The apparatus and method according to various embodiments of the present disclosure may determine a position of a UE, based on a result of PRS measurement by the UE, thereby allowing a position of the UE to be further accurately determined.

Effects that are obtainable from the present disclosure are not limited to the aforementioned effect, and other unstated effects will be clearly understood by one of ordinary skill in the art in view of descriptions below.

FIG. 1 is a diagram illustrating an architecture of a legacy LTE system.

Referring to FIG. 1, a radio access network (RAN) of the LTE system includes a plurality of next-generation BSs (or evolved nodes B (ENBs), nodes B or BSs) 1-05, 1-10, 1-15, and 1-20, a mobility management entity (MME) 1-25, and a serving-gateway (S-GW) 1-30. A UE (or a terminal) 1-35 may access an external network via the eNB 1-05, 1-10, 1-15, or 1-20 and the S-GW 1-30.

In FIG. 1, the eNB 1-05, 1-10, 1-15, or 1-20 may correspond to a legacy node B of a universal mobile telecommunications system (UMTS). The eNB 1-05, 1-10, 1-15, or 1-20 may be connected to the UE 1-35 via wireless channels and may perform complex functions, compared to the legacy node B. In the LTE system, all user traffic data including real-time services such as voice over Internet protocol (VOIP) may be serviced via shared channels. Therefore, an entity for performing scheduling by collating state information of UEs, the state information including buffer state information, available transmit power state information, and channel state information, may be required and the eNB 1-05, 1-10, 1-15, or 1-20 may operate as such an entity. One eNB may generally control a plurality of cells. For example, the LTE system may use a radio access technology such as orthogonal frequency division multiplexing (OFDM) at a bandwidth of 20 MHz so as to achieve a data rate of 100 Mbps. Also, the LTE system may apply adaptive modulation & coding (AMC) to determine a modulation scheme and a channel coding rate in accordance with a channel state of the UE. The S-GW 1-30 may be an entity for providing data bearers, and may generate or remove the data bearers according to the control by the MME 1-25. The MME may be an entity for performing a mobility management function and various control functions on the UE and may be connected to the plurality of eNBs.

Figure 2:
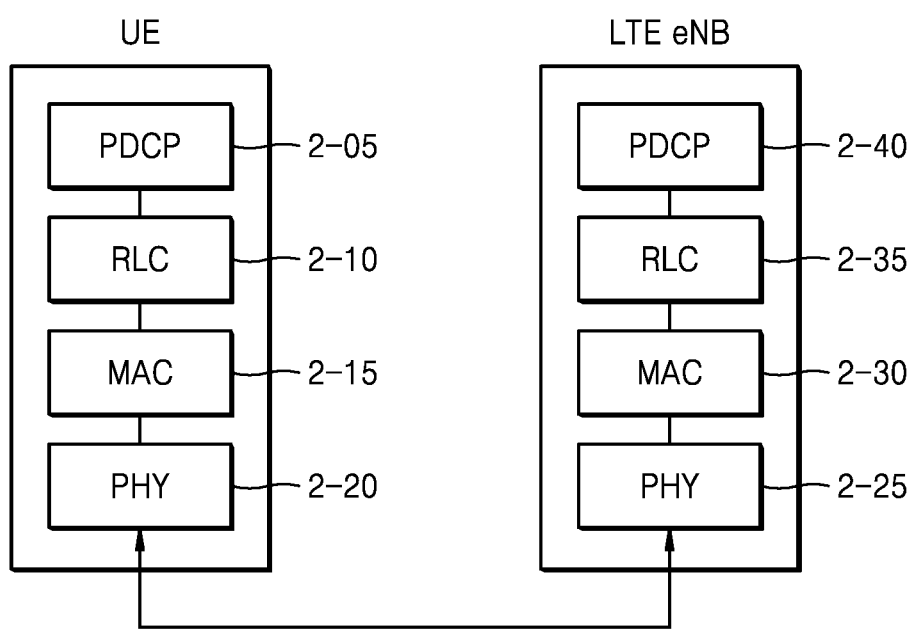
FIG. 2 is a diagram illustrating a radio protocol architecture of an LTE system according to an embodiment of the present disclosure.

FIG. 2 is a diagram illustrating a radio protocol architecture of an LTE system according to an embodiment of the present disclosure.

Referring to FIG. 2, the radio protocol architecture of the LTE system may include packet data convergence protocol (PDCP) layers 2-05 and 2-40, radio link control (RLC) layers 2-10 and 2-35, media access control (MAC) layers 2-15 and 2-30, and physical (PHY) layers 2-20 and 2-25 respectively for a UE and a LTE eNB. The PDCP layer may be in charge of Internet protocol (IP) header compression/decompression. Main functions of the PDCP layer may be summarized as shown below.

Header compression and decompression: Robust Header Compression (ROHC) only

Transfer of user data

In-sequence delivery of upper layer Protocol Data Units (PDUs) at Packet Data Convergence Protocol (PDCP) re-establishment procedure for Radio Link Control (RLC) Acknowledged Mode (AM)

For split bearers in Dual Connectivity (DC) (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The RLC layer 2-10 or 2-35 may perform an automatic repeat request (ARQ) operation by reconfiguring PDCP PDUs to appropriate sizes. Main functions of the RLC layer may be summarized as shown below.

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC Service Data Unit (SDU) discard (only for Unacknowledged mode (UM) and AM data transfer)

RLC re-establishment

The MAC layer 2-15 or 2-30 may be connected to a plurality of RLC layers configured for one UE, and may multiplex RLC PDUs into a MAC PDU and demultiplex the RLC PDUs from the MAC PDU. Main functions of the MAC layer may be summarized as shown below.

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through Hybrid Automatic Repeat Request (HARQ)

Priority handling between logical channels of one UE

Priority handling between UEs by means of dynamic scheduling

Multimedia Broadcast and Multicast Service (MBMS) service identification

Transport format selection

Padding

The PHY layer 2-20 or 2-25 may channel-code and modulate upper layer data into OFDM symbols and may transmit the OFDM symbols via a wireless channel, or may demodulate OFDM symbols received via a wireless channel and may channel-decode and transmit the OFDM symbols to an upper layer.

Figure 3:
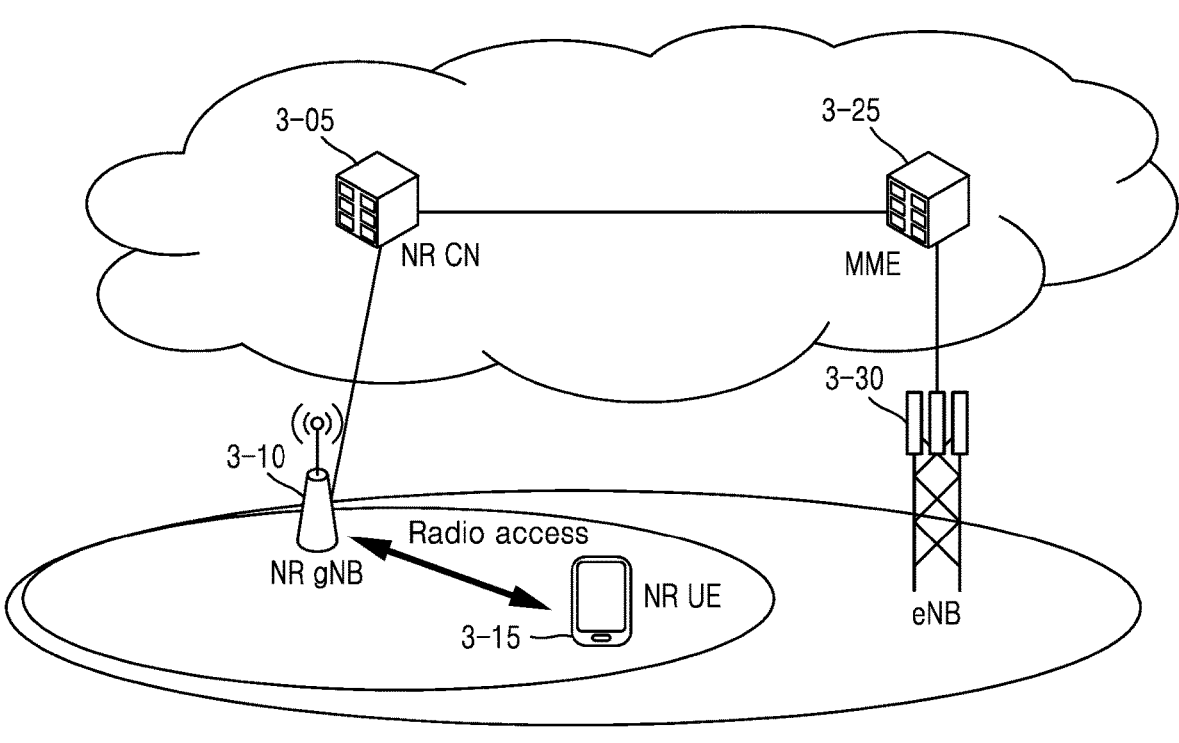
FIG. 3 is a diagram illustrating an architecture of a next-generation mobile communication system according to an embodiment of the present disclosure.

FIG. 3 is a diagram illustrating an architecture of a next-generation mobile communication system according to an embodiment of the present disclosure.

Referring to FIG. 3, a radio access network of the next-generation mobile communication system (e.g., an NR or 5G system) may include a next-generation BS (a new radio node B, e.g., NR gNB or NR BS) 3-10 and a new radio core network (NR CN) 3-05. An NR UE (or NR terminal) 3-15 may access an external network via the NR gNB 3-10 and the NR CN 3-05.

In FIG. 3, the NR gNB 3-10 may correspond to an eNB of a legacy LTE system. The NR gNB may be connected to the NR UE 3-15 via wireless channels and may provide superior services compared to a legacy node B. In the next-generation mobile communication system, all user traffic data may be serviced via shared channels. Therefore, an entity for performing scheduling by collating, for example, buffer state information of UEs, available transmit power state information, and channel state information may be required and the NR gNB 3-10 may operate as such an entity. One NR gNB may control a plurality of cells. The next-generation mobile communication system may have a bandwidth greater than the maximum bandwidth of the LTE system so as achieve an ultrahigh data rate. Also, a beam-forming technology may be additionally associated with OFDM as a radio access technology. Also, AMC may also be applied to determine a modulation scheme and a channel coding rate in accordance with a channel state of the NR UE. The NR CN 3-05 may perform functions such as mobility support, bearer configuration, quality of service (QoS) configuration, and the like. The NR CN may be an entity for performing a mobility management function and various control functions on the NR UE and may be connected to a plurality of BSs. Also, the next-generation mobile communication system may cooperate with the legacy LTE system, and the NR CN 3-05 may be connected to an MME 3-25 via a network interface. The MME may be connected to a legacy eNB 1-05, 1-10, 1-15, or 1-20.

Figure 4:
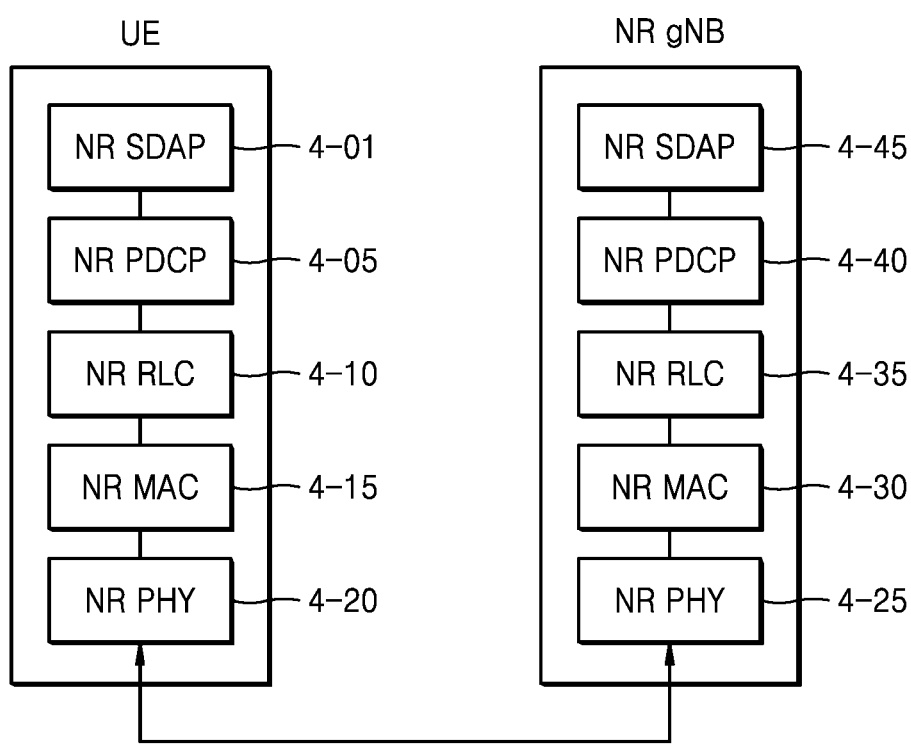
FIG. 4 is a diagram illustrating a radio protocol architecture of a next-generation mobile communication system according to an embodiment of the present disclosure.

FIG. 4 is a diagram illustrating a radio protocol architecture of a next-generation mobile communication system according to an embodiment of the present disclosure.

Referring to FIG. 4, a radio protocol of the next-generation mobile communication system may include NR Service Data Adaptation Protocol (SDAP) layers 4-01 and 4-45, NR PDCP layers 4-05 and 4-40, NR RLC layers 4-10 and 4-35, NR MAC layers 4-15 and 4-30, and NR PHY layers 4-20 and 4-25 respectively for a UE and an NR gNB.

Main functions of the NR SDAP layer 4-01 or 4-45 may include some of the following functions.

Transfer of user plane data

Mapping between a QoS flow and a DRB for both downlink (DL) and uplink (UL)

Marking QoS flow identifier (ID) in both DL and UL packets

Reflective QoS flow to DRB mapping for the UL SDAP PDUs.

With regard to the NR SDAP layer, the UE may be configured with information about whether to use a header of the NR SDAP layer or to use functions of the NR SDAP layer by using a radio resource control (RRC) message per PDCP layer, per bearer, or per logical channel, the RRC message being received from the NR gNB. When the SDAP header is configured, a 1-bit non access stratum (NAS) reflective QoS indicator and a 1-bit access stratum (AS) reflective QoS indicator of the SDAP header may be used to indicate the UE to update or reconfigure UL and DL QoS flow and data bearer mapping information. The SDAP header may include QoS flow ID information indicating QoS. QoS information may be used as data processing priority information or scheduling information for appropriately supporting a service.

Main functions of the NR PDCP layer 4-05 or 4-40 may include some of functions below.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

In the descriptions above, the reordering function of the NR PDCP layer may indicate a function of reordering PDCP PDUs received from a lower layer, on a PDCP sequence number (SN) basis. The reordering function of the NR PDCP layer may include a function of delivering the reordered data to an upper layer in order or may include a function of immediately delivering the reordered data out of order, may include a function of recording missing PDCP PDUs by reordering the received PDCP PDUs, may include a function of reporting status information of the missing PDCP PDUs to a transmitter, and a function of requesting to retransmit the missing PDCP PDUs.

Main functions of the NR RLC layer 4-10 or 4-35 may include at least some of functions below.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the descriptions above, the in-sequence delivery function of the NR RLC layer may indicate a function of delivering RLC SDUs received from a lower layer, to an upper layer in order. When a plurality of RLC SDUs segmented from one RLC SDU are received, the in-sequence delivery function of the NR RLC layer may include a function of reassembling the RLC SDUs and delivering the reassembled RLC SDU.

The in-sequence delivery function of the NR RLC layer may include a function of reordering received RLC PDUs on a RLC SN or PDCP SN basis, may include a function of recording missing RLC PDUs by reordering the received RLC PDUs, may include a function of reporting status information of the missing RLC PDUs to a transmitter, and may include a function of requesting to retransmit the missing RLC PDUs.

The in-sequence delivery function of the NR RLC layer may include a function of delivering only RLC SDUs prior to a missing RLC SDU, to an upper layer in order when the missing RLC SDU exists.

The in-sequence delivery function of the NR RLC layer may include a function of delivering all RLC SDUs received before a timer starts, to an upper layer in order when a certain timer is expired, even when a missing RLC SDU exists.

The in-sequence delivery function of the NR RLC layer may include a function of delivering all RLC SDUs received up to a current time, to an upper layer in order when a certain timer is expired, even when a missing RLC SDU exists.

The NR RLC layer may process the RLC PDUs in order of reception and may deliver the RLC PDUs to the NR PDCP layer, regardless of SNs (out-of-sequence delivery).

When the NR RLC layer receives a segment, the NR RLC layer may reassemble the segment with other segments stored in a buffer or subsequently received, into a whole RLC PDU and may deliver the RLC PDU to the NR PDCP layer.

The NR RLC layer may not have a concatenation function, and the NR MAC layer may perform the concatenation function or the concatenation function may be replaced with a multiplexing function of the NR MAC layer.

In the descriptions above, the out-of-sequence delivery function of the NR RLC layer may refer to a function of directly delivering RLC SDUs received from a lower layer, to an upper layer out of order. The out-of-sequence delivery function of the NR RLC layer may include a function of reassembling a plurality of RLC SDUs segmented from one RLC SDU and delivering the reassembled RLC SDU when the segmented RLC SDUs are received. The out-of-sequence delivery function of the NR RLC layer may include a function of recording missing RLC PDUs by storing RLC SNs or PDCP SNs of received RLC PDUs and reordering the received RLC PDUs.

The NR MAC layer 4-15 or 4-30 may be connected to a plurality of NR RLC layers configured for one UE, and main functions of the NR MAC layer may include some of functions below.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layer 4-20 or 4-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 5:
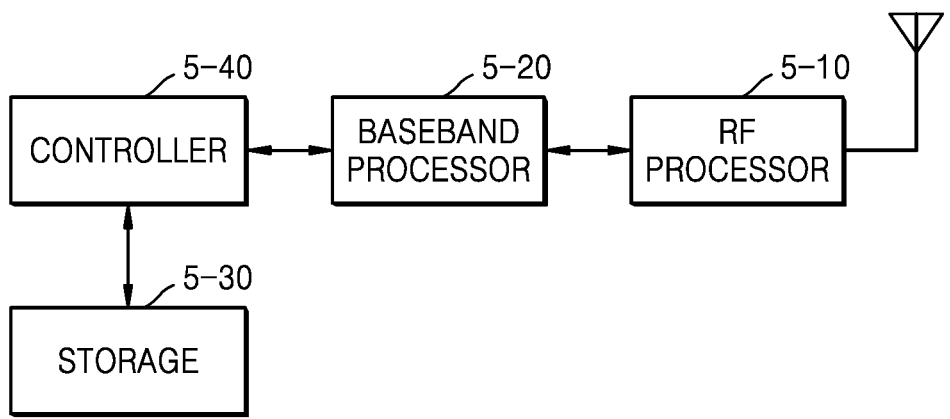
FIG. 5 is a block diagram illustrating an internal configuration of a user equipment (UE) according to an embodiment of the present disclosure.

FIG. 5 is a block diagram illustrating an internal configuration of a UE according to an embodiment of the present disclosure.

Referring to the drawing, the UE includes a radio frequency (RF) processor 5-10, a baseband processor 5-20, a storage 5-30, and a controller 5-40.

The RF processor 5-10 performs functions of transmitting and receiving signals via radio channels, such as band conversion and amplification of the signals. That is, the RF processor 5-10 up-converts a baseband signal provided from the baseband processor 5-20, into an RF band signal and then transmits the RF band signal via an antenna, and down-converts an RF band signal received via the antenna, into a baseband signal. For example, the RF processor 5-10 may include a transmission filter, a reception filter, an amplifier, a mixer, an oscillator, a digital-to-analog convertor (DAC), an analog-to-digital convertor (ADC), or the like. Although only one antenna is illustrated in FIG. 5, the UE may include a plurality of antennas. Also, the RF processor 5-10 may include a plurality of RF chains. In addition, the RF processor 5-10 may perform beamforming. For beamforming, the RF processor 5-10 may respectively adjust phases and intensities of signals to be transmitted or received via a plurality of antennas or antenna elements. Also, the RF processor 5-10 may perform a MIMO operation and may receive a plurality of layers in the MIMO operation.

The baseband processor 5-20 converts between a baseband signal and a bitstream based on physical entity specifications of a system. For example, for data transmission, the baseband processor 5-20 generates complex symbols by encoding and modulating a transmission bitstream. For data reception, the baseband processor 5-20 reconstructs a received bitstream by demodulating and decoding a baseband signal provided from the RF processor 5-10. For example, according to an OFDM scheme, for data transmission, the baseband processor 5-20 generates complex symbols by encoding and modulating a transmit bitstream, maps the complex symbols to subcarriers, and then configures OFDM symbols by performing inverse fast Fourier transform (IFFT) and cyclic prefix (CP) insertion. For data reception, the baseband processor 5-20 segments a baseband signal provided from the RF processor 5-10, into OFDM symbol units, reconstructs signals mapped to subcarriers by performing fast Fourier transform (FFT), and then reconstructs a received bitstream by demodulating and decoding the signals.

The baseband processor 5-20 and the RF processor 5-10 transmit and receive signals as described above. Accordingly, the baseband processor 5-20 and the RF processor 5-10 may also be called a transmitter, a receiver, a transceiver, or a communicator. In addition, at least one of the baseband processor 5-20 and the RF processor 5-10 may include a plurality of communication modules to support a plurality of different radio access technologies. Also, at least one of the baseband processor 5-20 and the RF processor 5-10 may include different communication modules to process signals of different frequency bands. For example, the different radio access technologies may include a wireless LAN (e.g.: IEEE 802.11), a cellular network (e.g.: LTE), or the like. Also, the different frequency bands may include a super-high frequency (SHF) (e.g., 2.NRHz, NRhz) band and a millimeter wave (mm Wave) (e.g., 60 GHz) band.

The storage 5-30 stores basic programs, application programs, and data, e.g., configuration information, for operations of the UE. In particular, the storage 5-30 may store information associated with a second access node that performs wireless communication by using a second radio access technology. The storage 5-30 provides the stored data according to the request by the controller 5-40.

The controller 5-40 controls overall operations of the UE. For example, the controller 5-40 transmits and receives signals through the baseband processor 5-20 and the RF processor 5-10. Also, the controller 5-40 records and reads data on or from the storage 5-40. To this end, the controller 5-40 may include at least one processor. For example, the controller 5-40 may include a communication processor (CP) for controlling communications and an application processor (AP) for controlling an upper layer such as an application program.

Figure 6:
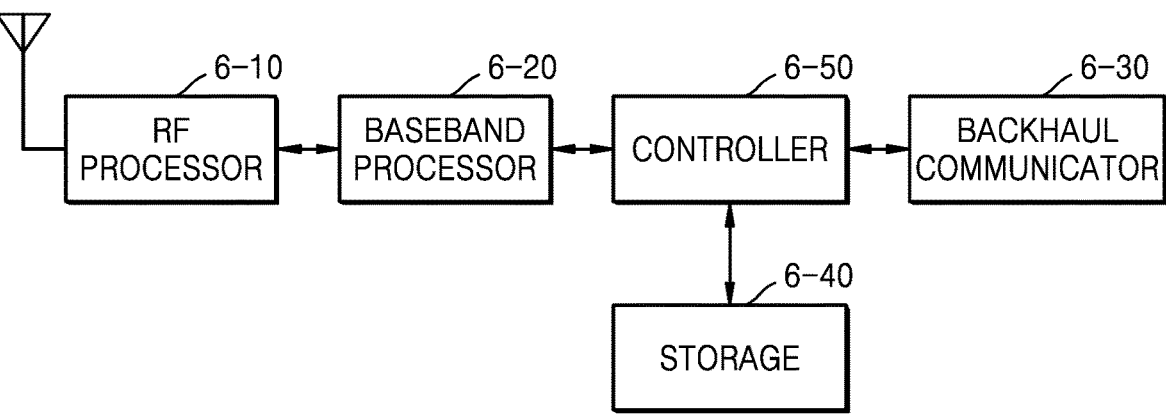
FIG. 6 is a block diagram illustrating a configuration of a base station (BS) according to an embodiment of the present disclosure.

FIG. 6 is a block diagram illustrating a configuration of a BS according to an embodiment of the present disclosure.

As illustrated in FIG. 6, the BS includes a RF processor 6-10, a baseband processor 6-20, a backhaul communicator 6-30, a storage 6-40, and a controller 6-50.

The RF processor 6-10 performs functions of transmitting and receiving signals via radio channels, e.g., band conversion and amplification of the signals. That is, the RF processor 6-10 up-converts a baseband signal provided from the baseband processor 6-20, into an RF band signal and then transmits the RF band signal via an antenna, and down-converts an RF band signal received via an antenna, into a baseband signal. For example, the RF processor 6-10 may include a transmission filter, a reception filter, an amplifier, a mixer, an oscillator, a DAC, an ADC, or the like. Although only one antenna is illustrated in FIG. 6, a first access node may include a plurality of antennas. Also, the RF processor 6-10 may include a plurality of RF chains. In addition, the RF processor 6-10 may perform beamforming. For beamforming, the RF processor 6-10 may respectively adjust phases and intensities of signals to be transmitted or received via a plurality of antennas or antenna elements. The RF processor may perform a DL MIMO operation by transmitting one or more layers.

The baseband processor 6-20 converts between a baseband signal and a bitstream, based on physical entity specifications of a first radio access technology. For example, for data transmission, the baseband processor 6-20 generates complex symbols by encoding and modulating a transmission bitstream. Also, for data reception, the baseband processor 6-20 reconstructs a received bitstream by demodulating and decoding a baseband signal provided from the RF processor 6-10. For example, according to an OFDM scheme, for data transmission, the baseband processor 6-20 generates complex symbols by encoding and modulating a transmission bitstream, maps the complex symbols to subcarriers, and then configures OFDM symbols by performing IFFT and CP insertion. Also, for data reception, the baseband processor 6-20 segments a baseband signal provided from the RF processor 6-10, into OFDM symbol units, reconstructs signals mapped to subcarriers by performing FFT, and then reconstructs a received bitstream by demodulating and decoding the signals. The baseband processor 6-20 and the RF processor 6-10 transmits and receives signals as described above. Accordingly, the baseband processor 6-20 and the RF processor 6-10 may also be called a transmitter, a receiver, a transceiver, a communicator, or a wireless communicator.

The backhaul communicator 6-30 provides an interface for communicating with other nodes in a network. That is, the backhaul communicator 6-30 converts a bitstream, which is transmitted from the primary BS to another node, for example, a secondary BS, a core network, etc. into a physical signal, and converts a physical signal, which is received from another node, into a bitstream.

The storage 6-40 stores basic programs, application programs, and data, e.g., configuration information, for operations of a primary BS. In particular, the storage 6-40 may store information about bearers allocated for a connected UE and measurement results reported from the connected UE. Also, the storage 6-40 may store criteria information used to determine whether to provide or release dual connectivity to or from the UE. The storage 6-40 provides the stored data according to the request by the controller 6-50.

The controller 6-50 controls overall operations of the primary BS. For example, the controller 6-50 transmits and receives signals via the baseband processor 6-20 and the RF processor 6-10, or the backhaul communicator 6-30. Also, the controller 6-50 records and reads data on or from the storage 6-40. To this end, the controller 6-50 may include at least one processor.

Figure 7:
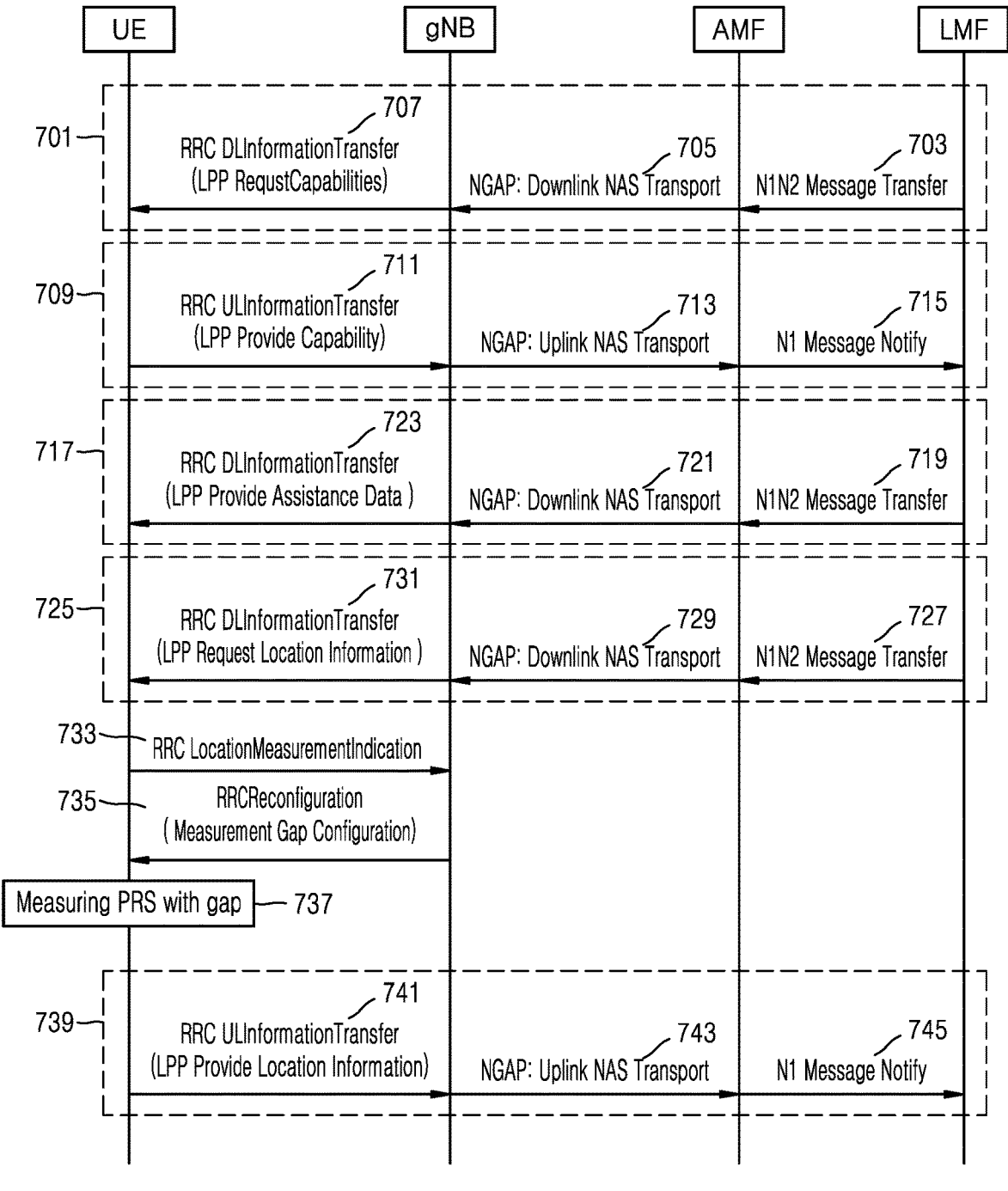
FIG. 7 is a diagram illustrating an existing procedure for position measurement.

FIG. 7 is a diagram illustrating a procedure for position measurement.

In operation 701, a UE receives a capacity information request from an LMF, and in operation 709, the UE transmits, to the LMF, information associated with a position measurement capability of the UE. Here, the LMF and the UE perform communication by using a message of a LTE positioning protocol (LPP). That is, in operation 703, when the LMF transfers a LPP Request Capabilities message to an access and mobility management function (AMF), the LMF may use a NIN2 message transfer message, and when the AMF receives the message, the AMF may extract the LPP Request Capabilities message from the NIN2 message transfer message. The AMF includes the LPP Request Capabilities message in a downlink NAS transport message and transfers the message to a BS associated with a target UE.

The BS includes the message in an RRC DLInformation-Transfer message and transfers the message to the UE.

In a case where the UE transfers the information associated with the position measurement capability to the LMF, in operation 711, when the UE includes an LPP Provide Capability message associated with the position measurement capability in an RRC ULInformation Transfer message and transfers the message to the BS, the BS extracts the LPP Provide Capability message from the RRC ULInformation Transfer message. In operation 713, the BS includes the LPP Provide Capability message in an Uplink NAS transport message, and transfers the message to the AMF. In operation 715, the AMF includes the LPP Provide Capability message in an NI message notify message and transfers the message to the LMF.

In operation 717, the LMF receives the information associated with the position measurement capability of the target UE and transfers position measurement assistance information to the UE. Here, in operation 719, the LMF includes a LPP ProvideAssistanceData message in a NIN2 message and transfers the message to the AMF, and in operation 721, the AMF receives the message, extracts and includes the LPP ProvideAssistanceData message in a DownlinkNASTransport message, and transfers the message to the BS. In operation 723, the BS includes the LPP ProvideAssistanceData message in an RRC DLInformation-Transfer message and transfers the message to the UE. When the UE receives the message, the UE identifies a frequency and transmission time of a PRS to be measured, information about association with a Tx/Rx point (TRP) of each PRS, and configuration information of each PRS resource and resource set. The LPP ProvideAssistanceData message may include assistance data for each method, and for example, may include information associated with DL PRS resource configuration.

Afterward, in operation 725, the LMF may request a position measurement indication via a specific position measurement method. Position measurement indication information is included in a LPP RequestLocationInformation message and is transferred to the UE via the AMF/the BS in operations 727, 729, and 731. Here, messages to be encapsulated are the same as used to transmit the LPP provide Assistance Data message. The LPP RequestLocationInformation message may include Common field and method specific fields, and for example, may include information as to whether to report a measured DL PRS resource ID (DL PRS resource id measured), and the like. The UE may determine how to measure a position and what to report to the BS, based on the LPP RequestLocationInformation in a given PRS situation. The UE may identify a current NR/EUTRA measurement state, based on the LPP Request-LocationInformation message, and may determine whether a measurement gap (MG) is requested within a capacity of the UE.

In operation 733, the UE having received this information compares the information with measurement configuration information that is currently maintained and operated, and when a capability of the UE which is requested for PRS measurement is insufficient, the UE requests the BS for a measurement gap. This request is transferred to the BS via an RRC Location MeasurementIndication message. The RRC Location MeasurementIndication message may include information indicating whether a radio access technology (RAT) to be measured is EUTRA or NR, frequency and PRS location information of each of cases where the RAT to be measured is NR and the RAT to be measures is EUTRA, or information indicating whether it is EUTRA fine detection.

In operation 735, the BS may detect the request and may configure the UE with a necessary measurement gap. Here, information transferred as measurement gap configuration may be gap length information, repetition period information, timing advance information, cell for timing ref information, and gap offset (i.e., a starting subframe of a gap window may be indicated) information. For example, gap offset may include 0 to MGRP-1. For example, measurement gap configuration may not be configured for each frequency but may be configured to be single. In operation 737, the UE having received this information measures a given PRS during a defined measurement gap period, and when a measurement result is available, in operation 739, the UE includes and transfers the measurement result in a LPP ProvideLocationInformation message to the BS. Here, in operation 741, the UE includes and transfers the LPP ProvideLocationInformation message in an RRC ULInformation Transfer message. In operations 743 and 745, the message is transferred to the LMF via the AMF, by using an interface and an encapsulation message which are the same as an existing LPP Provide Capability.

Due to this procedure, two processes of processing an RRC message occur after the UE receives the measurement indication, and a delay time occurs due to the processing.

TABLE 1

```
GapConfig ::=               SEQUENCE {
    gapOffset                   INTEGER (0..159),
    mgl                         ENUMERATED {ms1dot5, ms3, ms3dot5, ms4, ms5dot5, ms6},
    mgrp                        ENUMERATED {ms20, ms40, ms80, ms160},
    mgta                        ENUMERATED {ms0, ms0dot25, ms0dot5},
    ...,
    [[
    refServCellIndicator        EMERATED {pCell, pSCell, mcg-FR2}        OPTIONAL
    -- Cond NEDCorNRDC:
    ]],
    [[
    refFR2ServCellAsyncCA-r16   ServCellIndex                           OPTIONAL,
    -- Cond AsyncCA
    mgl-r16                     ENUMERATED {ms10, ms20}                 OPTIONAL
    -- Cond PRS
    ]]
```

According to information shown in Table 1, when information associated with gap configuration is notified to the UE via an RRCReconfiguration message, both mgl and mgrp may be independently configured, but there may be certain restrictions. For example, when mgrp is 20, mgl cannot be 10. Likewise, offset may be configured according to the certain restrictions, and for example, when mgrp is 80, offset cannot exceed 80.

Therefore, according to an embodiment, a network may pre-generate information about all available combinations via mgl, mgrp and offset, may allocate IDs and transfer them to the UE in advance, and may notify only an ID via downlink control information (DCI) or a MAC control element (CE) when requested, thereby decreasing an RRC processing delay.

According to an embodiment, a serving BS may receive PRS configuration information associated with Provide Assistance Data from the LMF, may configure a predictable measurement gap (MG), may allocate an ID to the MG, and may notify to the UE by allocating an ID to the MG, and here, the LMF may notify the serving BS of the PRS configuration information via NR Positioning Protocol A (NRPPa).

Figure 8:
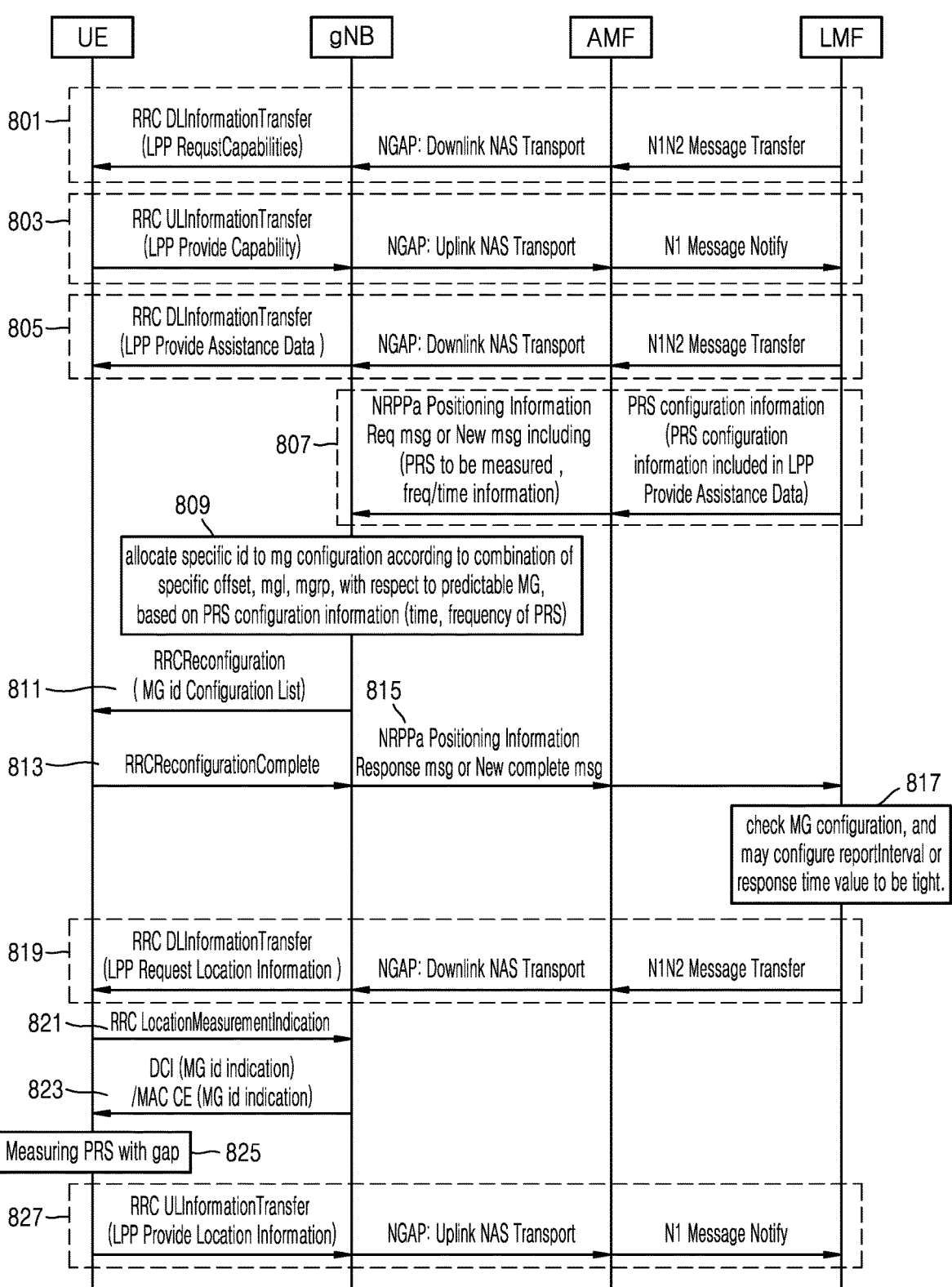
FIG. 8 is a diagram illustrating a measurement gap provision procedure according to an embodiment of the present disclosure.

FIG. 8 is a diagram illustrating a measurement gap provision procedure according to an embodiment of the present disclosure.

In detail, provided is the diagram illustrating a case where an LMF includes measurement PRS information based on assistance information in an NR Positioning Protocol A (NRPPa) message and transfers the message, and a BS transfers preset measurement gap information via RRC.

In this case, messages and an interface of a procedure in which, in operation 801, a UE receives a LPP RequestCapabilities message from the LMF, in operation 803, the UE responses to the LMF with respect to the reception, and in operation 805, the UE receives LPP ProvideAssistanceData are the same as the case of FIG. 7. Operations 801, 803, and 805 of FIG. 8 may respectively correspond to operations 701, 709, and 717 of FIG. 7.

In operation 807, in addition to the transfer of the LPP Provide Assistance Data message, the LMF may include, in the NRPPa message, a plurality of pieces of PRS configuration information included/used in a LPP ProvideAssistanceData message, and may transfer the message to the BS. The plurality of pieces of information may include all or some of a plurality of pieces of information below.

The information may have reference and neighbor TRP information and PRS configuration information at the TRP, regardless of a method.

DL-PRS-ID-Info: ID of reference TRP, PRS resource set id operated in corresponding TRP, frequency and time information of each resource with a set corresponding thereto and associated ID With respect to frequencies that are operated, for each TRP operating a PRS to be transmitted to a frequency corresponding thereto, TRP id, cell id, cgi (cell global id), Information of a frequency on which a corresponding PRS is transmitted (ARFCN information)

time skew offset with a reference TRP (offset of a difference between synchronized times), frame boundary offset, expected RSTD with ref TRP, DL-PRS-Info DL-PRS-ResourceSetID dl-PRS-Periodicity-and-ResourceSetSlotOffset (period of PRS resource)

dl-PRS-ResourceRepetitionFactor-r16 (This parameter controls how many times each DL-PRS Resource is repeated for a single instance of the DL-PRS Resource Set.)

dl-PRS-ResourceTimeGap-r16 (This field specifies the offset in units of slots between two repeated instances of a DL-PRS Resource corresponding to the same DL-PRS Resource ID within a single instance of the DL-PRS Resource Set. The time duration spanned by one DL-PRS Resource Set containing repeated DL-PRS Resources should not exceed DL-PRS-Periodicity.)

dl-PRS-NumSymbols-r16 (the number of symbols constituting one PRS resource on one slot)

dl-PRS-MutingOption1-r16 (This field specifies the DL-PRS muting configuration of the TRP for the Option-1 muting, as specified in TS 38.214, and comprises the following sub-fields: dl-prs-MutingBitRepetitionFactor indicates the number of consecutive instances of the DL-PRS Resource Set corresponding to a single bit of the nr-option1-muting bit map. Enumerated values n1, n2, n4, n8 correspond to 1, 2, 4, 8 consecutive instances, respectively. If this sub-field is absent, the value for dl-prs-MutingBitRepetitionFactor is n1. nr-option1-muting defines a bitmap of the time locations where the DL-PRS Resource is transmitted (value '1') or not (value '0') for a DL-PRS Resource Set, as specified in TS 38.214. If this field is absent, Option-1 muting is not in use for the TRP.)

dl-PRS-MutingOption2 (This field specifies the DL-PRS muting configuration of the TRP for the Option-2 muting, as specified in TS 38.214, and comprises the following sub-fields: nr-option2-muting defines a bitmap of the time locations where the DL-PRS Resource is transmitted (value '1') or not (value '0'). Each bit of the bit map corresponds to a single repetition of the DL-PRS Resource within an instance of a DL-PRS Resource Set, as specified in TS 38.214. If this field is absent, Option-2 muting is not in use for the TRP.)

dl-PRS-ResourcePower-r16 INTEGER (−60 . . . 50)

dl-PRS-ResourceList-r16 (for each resource, information below may be included.)

nr-DL-PRS-ResourceID dl-PRS-CombSizeN-AndReOffset-r16 (This field specifies the Resource Element spacing in each symbol of the DL-PRS Resource and the Resource Element (RE) offset in the frequency domain for the first symbol in a DL-PRS Resource.)

dl-PRS-ResourceSlotOffset (This field specifies the starting slot of the DL-PRS Resource with respect to the corresponding DL-PRS-Resource Set Slot Offset.)

dl-PRS-ResourceSymbolOffset (This field specifies the starting symbol of the DL-PRS Resource within a slot determined by dl-PRS-ResourceSlotOffset.)

dl-PRS-QCL-Info-r16 (This field specifies the QCL indication with other DL reference signals for serving and neighbouring cells and comprises the following sub-fields:

ssb indicates the SSB information for QCL source and comprises the following sub-fields: pci specifies the physical cell ID of the cell with the SSB that is configured as the source reference signal for the DL-PRS. The UE obtains the SSB configuration for the SSB configured as source reference signal for the DL-PRS by indexing to the field nr-SSB-Config with this physical cell identity. ssb-Index indicates the index for the SSB configured as the source reference signal for the DL-PRS. rs-Type indicates the QCL type.

dl-PRS indicates the PRS information for QCL source and comprises the followings sub-fields:

qcl-DL-PRS-ResourceID specifies DL-PRS Resource ID as the source reference signal for the DL-PRS. qcl-DL-PRS-ResourceSetID specifies the DL-PRS Resource Set ID.)

DL-PRS-Info includes symbol level information about all resources sets of TRP corresponding thereto.

SSB configuration information of all TRPs

The message may be an NRPPa Positioning Information Request message or a new NRPPa message.

In operation 809, the BS having received the message may configure the UE by associating IDs with a plurality of may request the UE for position measurement via a LPP RequestLocationInformation message.

In operation 821, the UE having received the position measurement request may compare its measurement capability with a plurality of pieces of currently-operating measurement configuration information and a plurality of pieces of PRS measurement information included in the LPP RequestLocationInformation message and the LPP ProvideAssistanceData message, and may transfer an RRC LocationMeasurementIndication message including necessary measurement gap information to the BS. Table 2 below indicates fields included in the RRC LocationMeasurementIndication message.

TABLE 2

```
LocationMeasurementInfo ::=              CHOICE {
    eutra-RSTD                           EUTRA-RSTD-InfoList,
    ...,
    eutra-FineTimingDetection            NULL,
    nr-PRS-Measurement-r16               NR-PRS-MeasurementInfoList-r16
}
EUTRA-RSTD-InfoList ::= SEQUENCE (SIZE (1..maxInterRAT-RSID-Freq)) OF EUTRA-RSTD-Info
EUTRA-RSTD-Info ::= SEQUENCE {
    carrierFreq                          ARFCN-ValueEUTRA,
    measPRS-Offset                       INTEGER (0..39),
    ...
}
NR-PRS-MeasurementInfoList-r16 ::= SEQUENCE (SIZE (1..maxFreqLayers)) OF NR-PRS-MeasurementInfo-r16
NR-PRS-MeasurementInfo-r16 ::=          SEQUENCE {
    dl-PRS-PointA-r16                    ARFCN-ValueNR,
    nr-MeasPRS-RepetitionAndOffset-r16   CHOICE {
        ms20-r16                         INTEGER (0..19),
        ms40-r16                         INTEGER (0..39),
        ms80-r16                         INTEGER (0..79),
        ms160-r16                        INTEGER (0..159),
        ...
    },
    nr-MeasPRS-Length-r16                ENUMERATED {ms1dot5, ms3, ms3dot5, ms4, ms5dot5, ms6, ms10, ms20},
    ...
}
``` measurement gap candidates configurable for the UE, based on the given PRS configuration information. Each measurement gap may be configured of a combination of specific values of measurement gap repetition period (mgrp), measurement gap length (mgl), gap offset, measurement gap timing advance (mgta), and refServCellIndication, and such configured measurement gaps are respectively associated with IDs. When multi-measurement gap configuration is transferred to the UE, based on the association, a measurement gap may be added or removed. In a case where the BS attempts to remove or modify a measurement gap preset for the UE, when the BS associates ID and signals it to the UE, the UE may remove or modify the measurement gap corresponding thereto. In operation 811, when information about the IDs respectively configured for the measurement gap candidates is transferred to the UE via an RRC Reconfiguration message, the UE may store the information, and in operation 813, the UE may transfer a complete message to the BS.

In operation 815, the BS having received the complete message may indicate measurement gap configuration allocation completion in an NRPPa PositioningInformationResponse message or a new NRPPa response message. In operation 817, the LMF having received the message may check measurement gap allocation completion and may configure a tighter measurement report interval or LPP response time at a later time, and in operation 819, the LMF The RRC LocationMeasurementIndication message transmitted from the UE to the BS may indicate information for the BS to refer when the BS configures a measurement gap at a later time. In detail, the RRC LocationMeasurementIndication message may include information about a reference signal time difference (RSTD) of EUTRA, a synchronization signal time of EUTRA, and PRS measurement information of NR.

In a case of PRS measurement of EUTRA, list information for each specific frequency may be included, and in a case of measurement of EUTRA, frequency information, ARFCN and PRS start offset information may be included. In a case of PRS measurement of NR, frequency information of NR PRS, a radiation interval of a PRS, a start time of a PRS, and a transmission period of a PRS may be included.

In operation 823, the BS having received the information may configure a measurement gap, based on the measurement gap information requested by the UE, and here, the BS may select one of pre-transferred measurement gap IDs, may include the selected one in a MAC control element (CE) or downlink control information (DCI) of a physical downlink control channel (PDCCH) and may transfer it.

In operation 825, the UE may perform PRS measurement by using the measurement gap, and when a measurement result is available, in operation 827, the UE may include information of the measurement result in a LPP ProvideLocationInformation message and may include the LPP ProvideLocationInformation message in an RRC ULInformation Transfer message and may transfer the message to the BS. The BS may transfer the LPP ProvideLocationInformation message to the LMF.

Therefore, according to an embodiment of the present disclosure, the UE and the BS may remove an RRC processing time.

Figure 9:
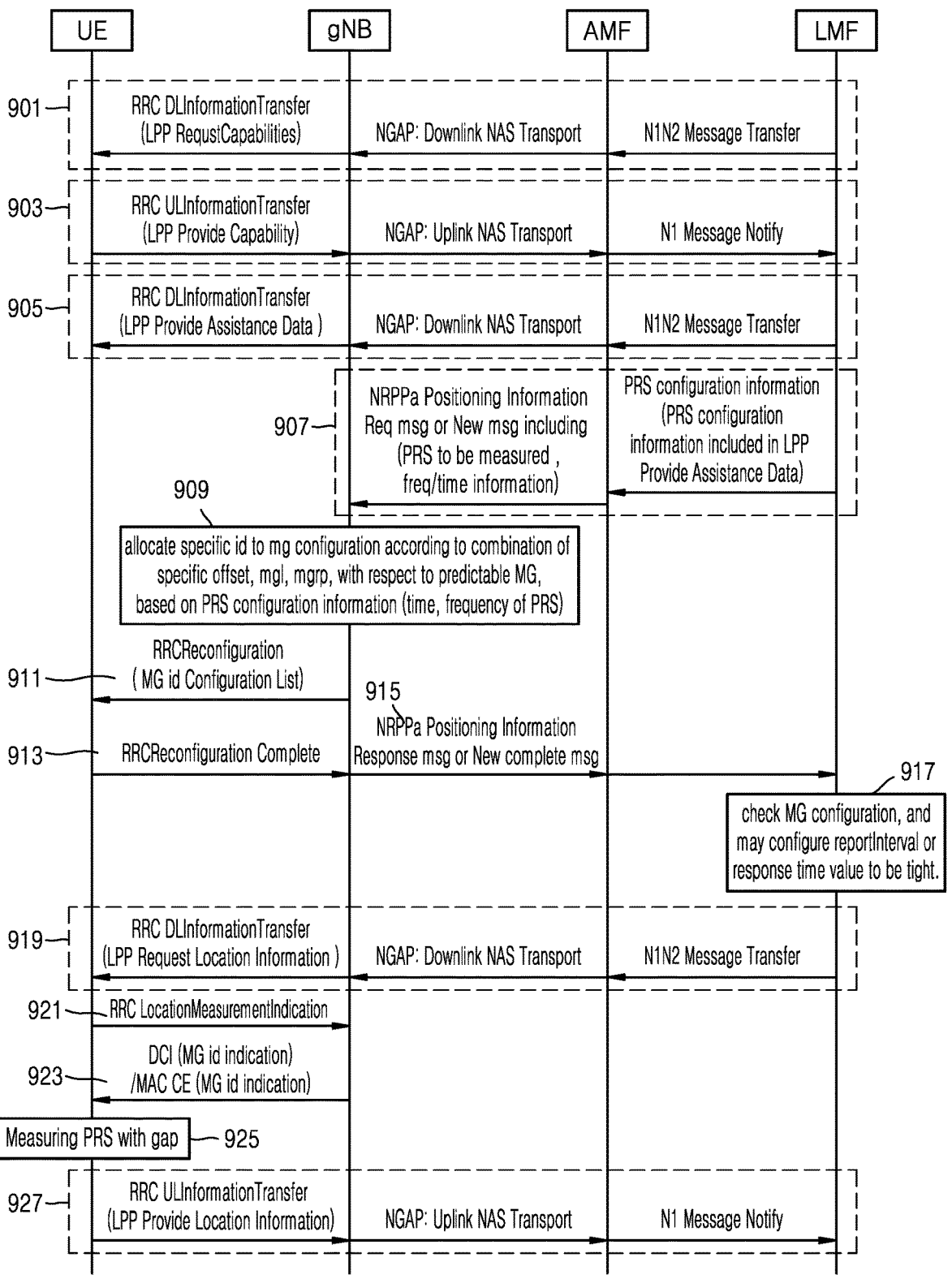
FIG. 9 is a diagram illustrating a measurement gap provision procedure according to another embodiment of the present disclosure.

FIG. 9 is a diagram illustrating a measurement gap provision procedure according to another embodiment of the present disclosure.

In detail, provided is the diagram illustrating a case where an LMF includes not only assistance information but also request location information and transfers not only a measurement PRS but also time information such as QoS and report period of measurement reporting in an NRPPa message.

A procedure in which a UE receives LPP ProvideAssistanceData is the same as that of FIG. 7. Operations 901, 903, and 905 of FIG. 9 may respectively correspond to operations 701, 709, and 717 of FIG. 7.

Afterward, in operation 907, the LMF may transfer, to a BS, information of measurement to be performed by the UE, by using information included in LPP RequestLocationInformation and information included in the LPP ProvideAssistanceData message in a previous operation.

Here, the information being transferred may be information included in the LPP ProvideAssistanceData message, may include a plurality of pieces of information stated with reference to FIG. 8, and may additionally include a plurality of pieces of information below, regardless of a measurement method, measurement type (UE based or UE assisted)

reporting type (event triggered or periodic reporting), whether to transfer at every cell change/reportingduration (Maximum duration of triggered reporting in seconds)

periodical report config, reportingAmount indicates the number of periodic location information reports requested.

reportingInterval indicates the interval between location information reports and the response time requirement for the first location information report.

QoS horizontalAccuracy indicates the maximum horizontal error in the location estimate at an indicated confidence level.

verticalAccuracy indicates the maximum vertical error in the location estimate at an indicated confidence level and is only applicable when a vertical coordinate is requested response time time indicates the maximum response time as measured between receipt of the RequestLocationInformation and transmission of a ProvideLocationInformation.

responseTimeEarlyFix indicates the maximum response time as measured between receipt of the RequestLocationInformation and transmission of a ProvideLocationInformation containing early location measurements or an early location estimate.

Also, for each of measurement methods, a plurality of pieces of information below may be indicated whether measurement PRS resource/set id are included, measurement metric, for example, rsrp measurement or RSTD measurement Assistance availability (whether the UE can additionally request assistance information is indicated)

in measurement, time granularity of a measurement value to be reported in measurement, whether an additional path is present in measurement, the number of measurement values to be reported The plurality of pieces of information may be included in a new message of NRPPa or an existing PositioningInformationRequest message and may be transferred to the BS.

In operation 909, the BS having received the message including not only PRS configuration information associated with the LPP Provide Assistance Data message but also including information associated with the LPP Request Location Information message may configure the UE by respectively associating IDs with a plurality of measurement gap candidates configurable for the UE, based on the given PRS information and measurement/report configuration information for each position measurement method. Each measurement gap may be configured of a combination of specific values of measurement gap repetition period (mgrp), measurement gap length (mgl), gap offset, measurement gap timing advance (mgta), and refServCellIndication, and such configured measurement gaps are respectively associated with IDs. When multi-measurement gap configuration is transferred to the UE, based on the association, a measurement gap may be added or removed. In a case where the BS attempts to remove or modify a measurement gap preset for the UE, when the BS associates ID and signals it to the UE, the UE may remove or modify the measurement gap corresponding thereto.

In operation 911, when information about the IDs respectively corresponding to the measurement gap candidates is transferred to the UE via an RRC Reconfiguration message, the UE may store the information, and in operation 913, the UE may transfer a complete message to the BS.

In operation 915, the BS having received the complete message may indicate measurement gap configuration allocation completion in an NRPPa PositioningInformationResponse message or a new NRPPa response message. In operation 917, the LMF having received the message may check measurement gap allocation completion and may configure a tighter measurement report interval or LPP response time at a later time, and in operation 919, the LMF may request the UE for position measurement via a LPP RequestLocationInformation message.

In operation 921, the UE having received the request may compare a plurality of pieces of currently-operating measurement configuration information with a plurality of pieces of PRS measurement information included in the LPP RequestLocationInformation message and the LPP ProvideAssistanceData message, and may transfer an RRC LocationMeasurementIndication message including necessary measurement gap information to the BS.

In operation 923, the BS having received the information may configure a measurement gap, based on the measurement gap information requested by the UE, and here, the BS may select one of pre-transferred measurement gap IDs, may include the selected one in a MAC CE or DCI of a PDCCH and may transfer it.

In operation 925, the UE may perform PRS measurement by using the measurement gap, and when a measurement result is available, in operation 927, the UE may include the measurement result in a LPP ProvideLocationInformation message and may include the message in an RRC ULInformationTransfer message and may transfer the message to the BS. The BS may transfer the LPP message to the LMF.

According to an embodiment, based on not only the PRS configuration information associated with the LPP Provide Assistance Data message but also information associated with the LPP Request Location Information message, e.g., the time information such as QoS and report period of measurement reporting, the BS may configure IDs respectively corresponding to measurement gap candidates. Therefore, when multiple PRSs are measured for each method, it is requested to configure IDs respectively corresponding to measurement gap candidates, by also considering information associated with a LPP Request Location Information message.

Figure 10:
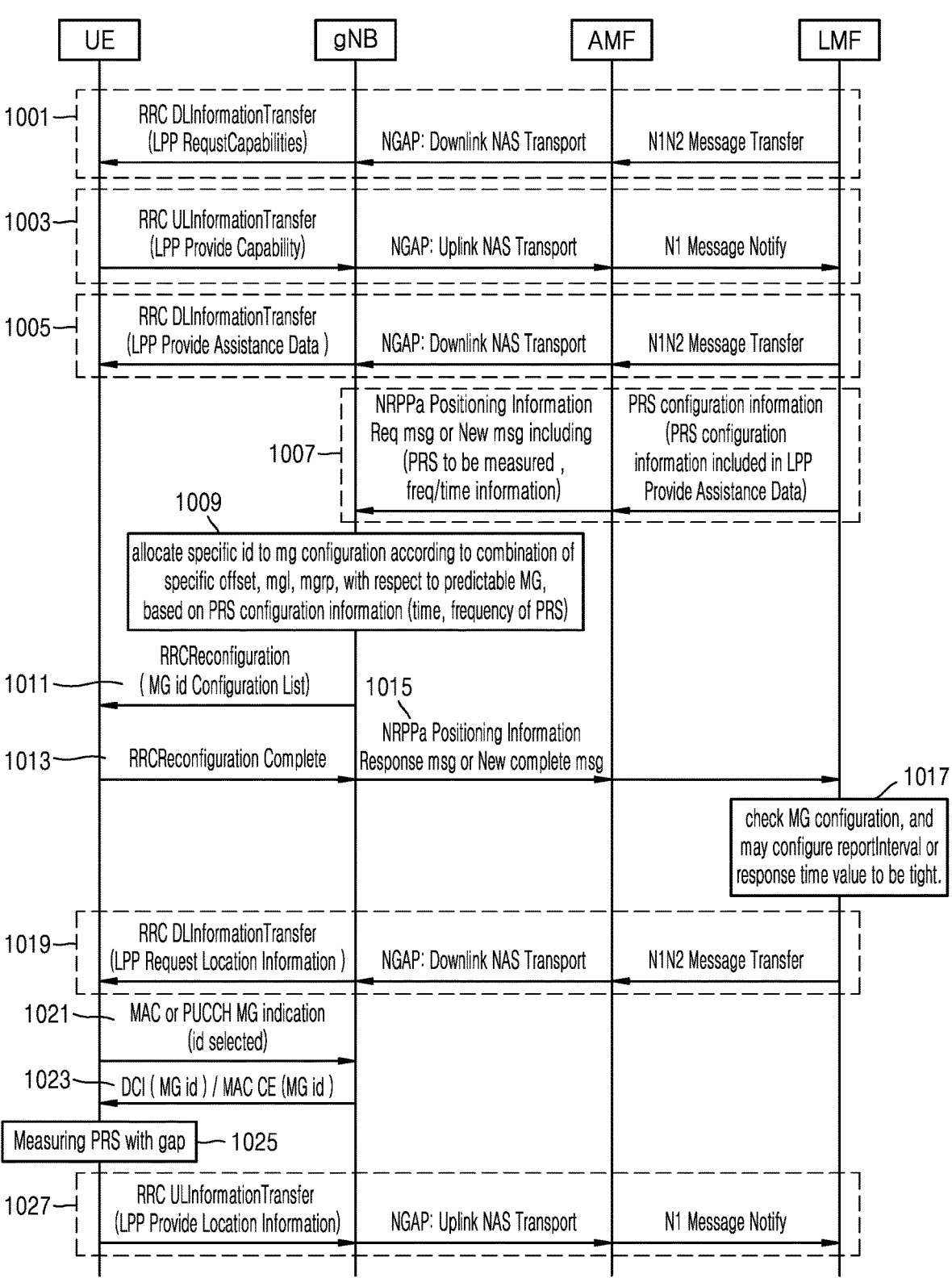
FIG. 10 is a diagram illustrating a measurement gap provision procedure according to another embodiment of the present disclosure.

FIG. 10 is a diagram illustrating a measurement gap provision procedure according to another embodiment of the present disclosure.

Provided is the diagram illustrating a case where an LMF includes PRS configuration information based on assistance information in an NRPPa message and transfers the message, and a BS transfers preset measurement gap information by RRC. Provided is the diagram illustrating the case where a UE reports, to the BS, a measurement gap ID requested in the received gap information.

Operations of the case are equal to operations of FIG. 8 in which the UE receives an LPP RequestLocationInformation message from the LMF and transfers a complete message to the BS. Operations 1001 to 1019 of FIG. 10 may respectively correspond to operations 801 to 819 of FIG. 8.

In operation 1021, the UE having received a position measurement request from the BS may compare its measurement capability with a plurality of pieces of currently-operating measurement configuration information and a plurality of pieces of PRS measurement information included in the LPP RequestLocationInformation message and the LPP ProvideAssistanceData message, may select a measurement gap allowable and desirable for the UE from among preset measurement gaps, and may notify an ID to the BS. The information may be transferred to the BS via RRC LocationMeasurementIndication, or may be transferred via an MAC CE.

According to an embodiment, the UE may determine one measurement gap candidate from among measurement gap candidates, based on information about IDs respectively configured for the measurement gap candidates which is received from the BS and the measurement capability of the UE, and may transmit information about an ID corresponding to the determined measurement gap candidate to the BS. For example, the UE may allocate a specific ID to measurement gap (MG) configuration according to a combination of specific offset, mgl, and mgrp, may select an ID corresponding to an optimal MG from among given MGs, and may report the selected ID to a serving cell.

In operation 1023, the BS having received the information may configure a measurement gap, based on the measurement gap information requested by the UE, and here, the BS may select one of measurement gap IDs pre-transferred to the UE, may include the selected one in a MAC CE or a PDCCH and may transfer it. If the ID is "ID of a desired measurement gap" the UE transferred to the BS in a previous operation, this may indicate to activate configuration of a measurement gap corresponding thereto. Also, if the ID is another ID that is not the ID of the desired measurement gap, this means that the BS configures a gap different from the UE-requested gap, and the UE has to activate and use the gap corresponding to the measurement gap ID received from the BS.

In operation 1025, the UE may perform PRS measurement by using the measurement gap, and when a measurement result is available, in operation 1027, the UE may include the measurement result in a LPP ProvideLocation-Information message and may include the message in an RRC ULInformationTransfer message and may transfer the message to the BS. The BS may transfer the LPP message to the LMF.

Figure 11:
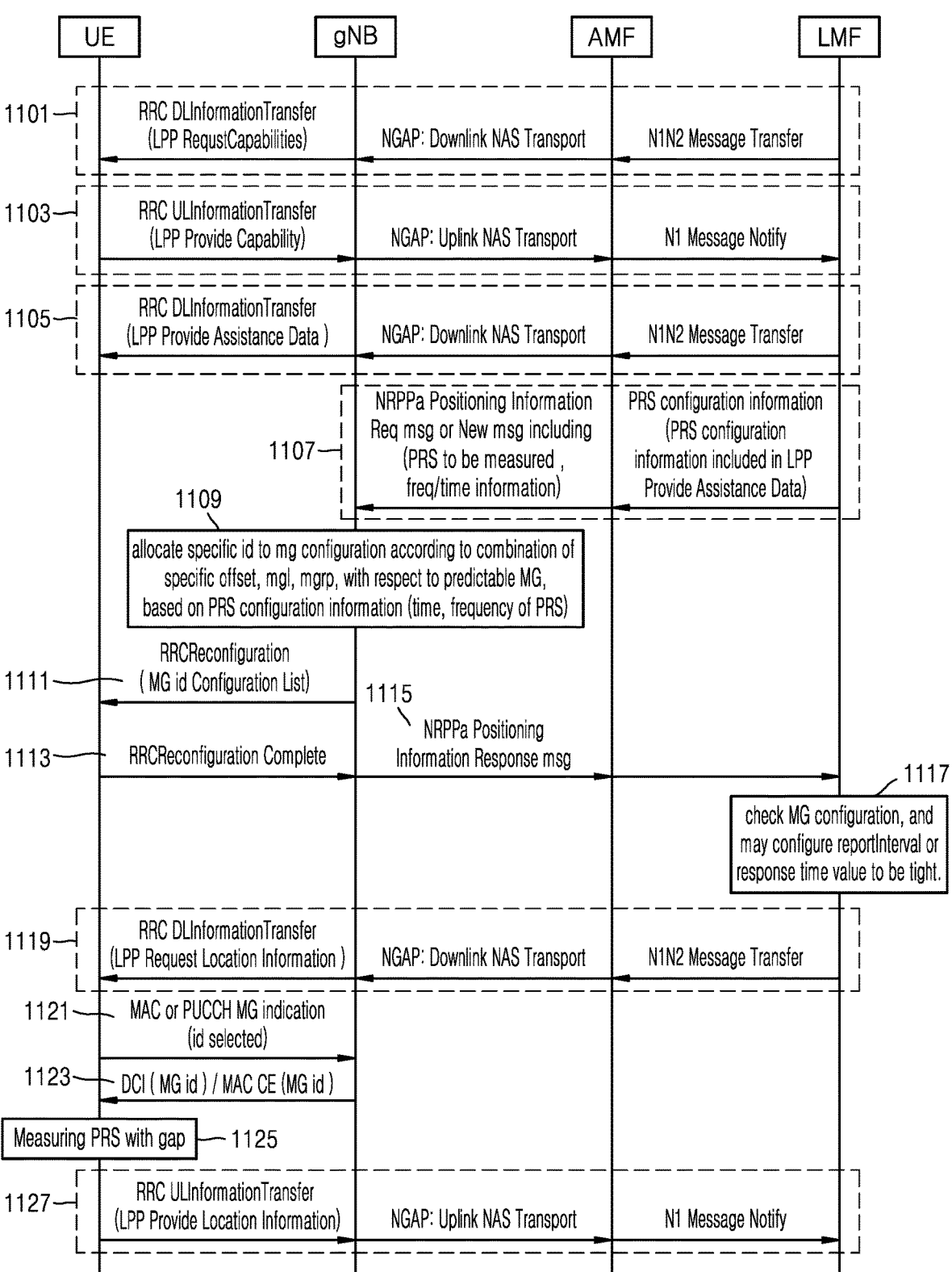
FIG. 11 is a diagram illustrating a measurement gap provision procedure according to another embodiment of the present disclosure.

FIG. 11 is a diagram illustrating a measurement gap provision procedure according to another embodiment of the present disclosure.

Provided is the diagram illustrating a case where an LMF includes not only assistance information but also request location information and transfers not only a measurement PRS but also time information such as QoS and report period of measurement reporting in an NRPPa message, and a BS transfers preset measurement gap information by RRC. Provided is the diagram illustrating the case where a UE reports, to the BS, a measurement gap ID requested in the received gap information.

Operations of the case are equal to operations of FIG. 9 in which the UE receives an LPP RequestLocationInformation message from the LMF and transfers a complete message to the BS. Operations 1101 to 1119 of FIG. 11 may respectively correspond to operations 901 to 919 of FIG. 9.

In operation 1121, the UE having received a position measurement request from the BS may compare its measurement capability with a plurality of pieces of currently-operating measurement configuration information and a plurality of pieces of PRS measurement information included in the LPP RequestLocationInformation message and the LPP ProvideAssistanceData message, may select a measurement gap allowable and desirable for the UE from among preset measurement gaps, and may notify an ID to the BS. The information may be transferred to the BS via an RRC LocationMeasurementIndication message, or may be transferred via an MAC CE. For example, the UE may select an ID corresponding to an optimal MG from among given MGs, and may report the selected ID to a serving cell.

In operation 1123, the BS having received the information about the ID corresponding to the measurement gap selected by the UE may configure a measurement gap, based on the measurement gap information requested by the UE, and here, the BS may select one of measurement gap IDs pre-transferred to the UE, may include the selected one in a MAC CE or a PDCCH and may transfer it. If the ID is "ID of a desired measurement gap" the UE transferred to the BS in a previous operation, this may indicate to activate configuration of a measurement gap corresponding thereto. Also, if the ID is another ID that is not the ID of the desired measurement gap, this means that the BS configures a gap different from the UE-requested gap, and the UE has to activate and use a measurement gap configured by the BS.

In operation 1125, the UE may perform PRS measurement by using the measurement gap, and when a measurement result is available, in operation 1127, the UE may include information of the measurement result in a LPP ProvideLocationInformation message and may include the message in an RRC ULInformation Transfer message and may transfer the message to the BS. The BS may transfer the LPP message to the LMF.

Figure 12:
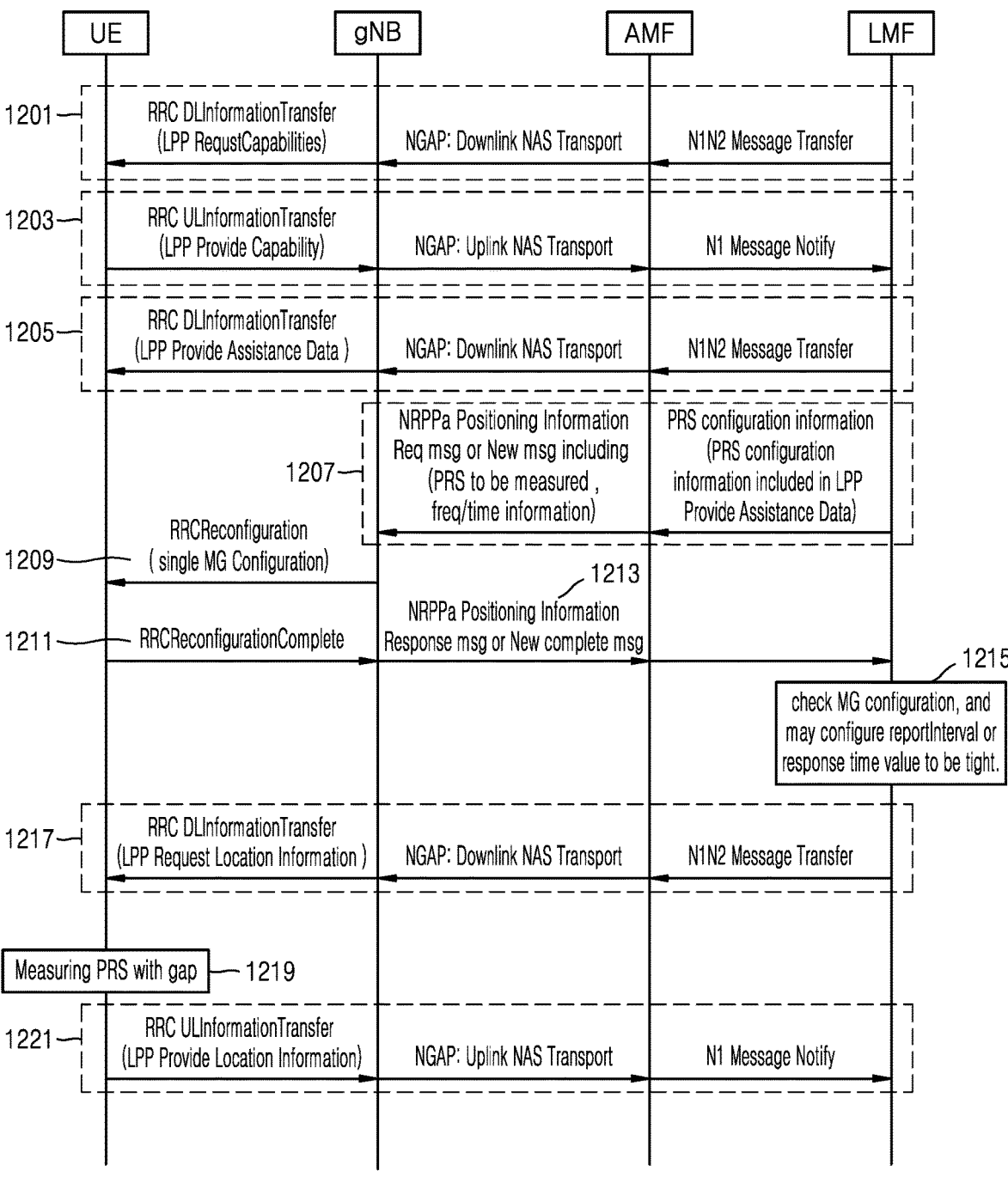
FIG. 12 is a diagram illustrating a measurement gap provision procedure according to another embodiment of the present disclosure.

FIG. 12 is a diagram illustrating a measurement gap provision procedure according to another embodiment of the present disclosure.

Provided is the diagram illustrating a case where a BS having received, via an NRPPa, information of a requested measurement gap configures, by RRC, one measurement gap by considering the information, and a UE immediately applies the measurement gap.

Processes of the UE and an LMF are equal to processes up to a process of receiving LPP Provide Assistance Data in FIG. 11. Operations 1201 to 1205 of FIG. 12 may correspond to operations 1101 to 1105 of FIG. 11.

Afterward, in operation 1207, the LMF may transfer assistance data and some or entire information of PRS information included in a next LPP Request Location Information message to a BS by using a Positioning Information Request message of NRPPa or a new NRPPa message.

In operation 1209, the BS having received the information may configure one measurement gap by using PRS time and frequency information and measurement result reporting interval and quality information. If a measurement gap is not previously configured, or even if it is configured, if a different gap is configured, the BS may give corresponding gap configuration to the UE via an RRCReconfiguration message.

The UE having received the configuration may apply the given gap. For example, the UE may activate and use an MG notified by the BS.

In operation 1211, the UE may transfer a complete message to the BS. In operation 1213, the BS having received the complete message may indicate measurement gap configuration allocation completion in an NRPPa PositioningInformationResponse message or a new NRPPa response message. In operation 1215, the LMF having received the message may check measurement gap allocation completion and may configure a tighter measurement report interval or LPP response time at a later time.

Afterward, in operation 1217, the LMF may transfer an LPP Request location Information message to the UE and thus the UE may perform measurement. In operation 1219, the UE may perform measurement by using the measurement gap notified by the BS in operation 1209, and when a measurement result is available, in operation 1221, the UE may include information about the measurement result in an LPP Provide location information message and may transfer the message to the LMF.

In the examples above, when the UE and the BS exchange an LPP message, they use a UL for a ULInformationTransfer message and use a DL for a DLInformation Transfer message, and when the BS and the LMF exchange a message, DownlinkNASTansport/UplinkNASTransport messages on an NGAP interface of FIG. 7 are used. Also, in proposed techniques, NRPPa messages exchanged between the LMF and the BS are included and transferred in DownlinkUEAssociatedNRPPaTransport or UplinkUEAssociatedNRPPaTransport on the NGAP interface.

With respect to all embodiments in which the BS transfers a measurement gap via DCI or an MAC CE, the UE having received a signal corresponding thereto may activate the measurement gap upon receipt of the signal and may switch a current active bandwidth part (BWP) to a frequency region where a PRS exists. For example, one index transferred by the BS via DCI or an MAC CE may indicate one measurement gap window that is a combination of a gap length, a gap period, and a gap starting offset, may indicate a specific serving cell for PRS measurement, and may indicate a specific BWP in the specific serving cell. In this case, information in which each ID is associated with the measurement gap, a serving cell in which the UE has to be positioned for measurement, and a BWP on which the UE has to be positioned for measurement may be transmitted in advance, via an RRC message for pre-configuring a measurement gap. In another case, a measurement gap, a serving cell for measurement, and a BWP in the serving cell are expressed as separate IDs and may be pre-configured for the UE.

The UE having received information of the ID or respective IDs of the measurement gap, the serving cell, and the BWP may move to the given BWP of the serving cell at a measurement gap window corresponding to the ID, when an active BWP of a serving cell in which the UE is positioned is not the serving cell corresponding to the given ID and is not the BWP corresponding to the given ID, and may perform a corresponding PRS.

Figure 13:
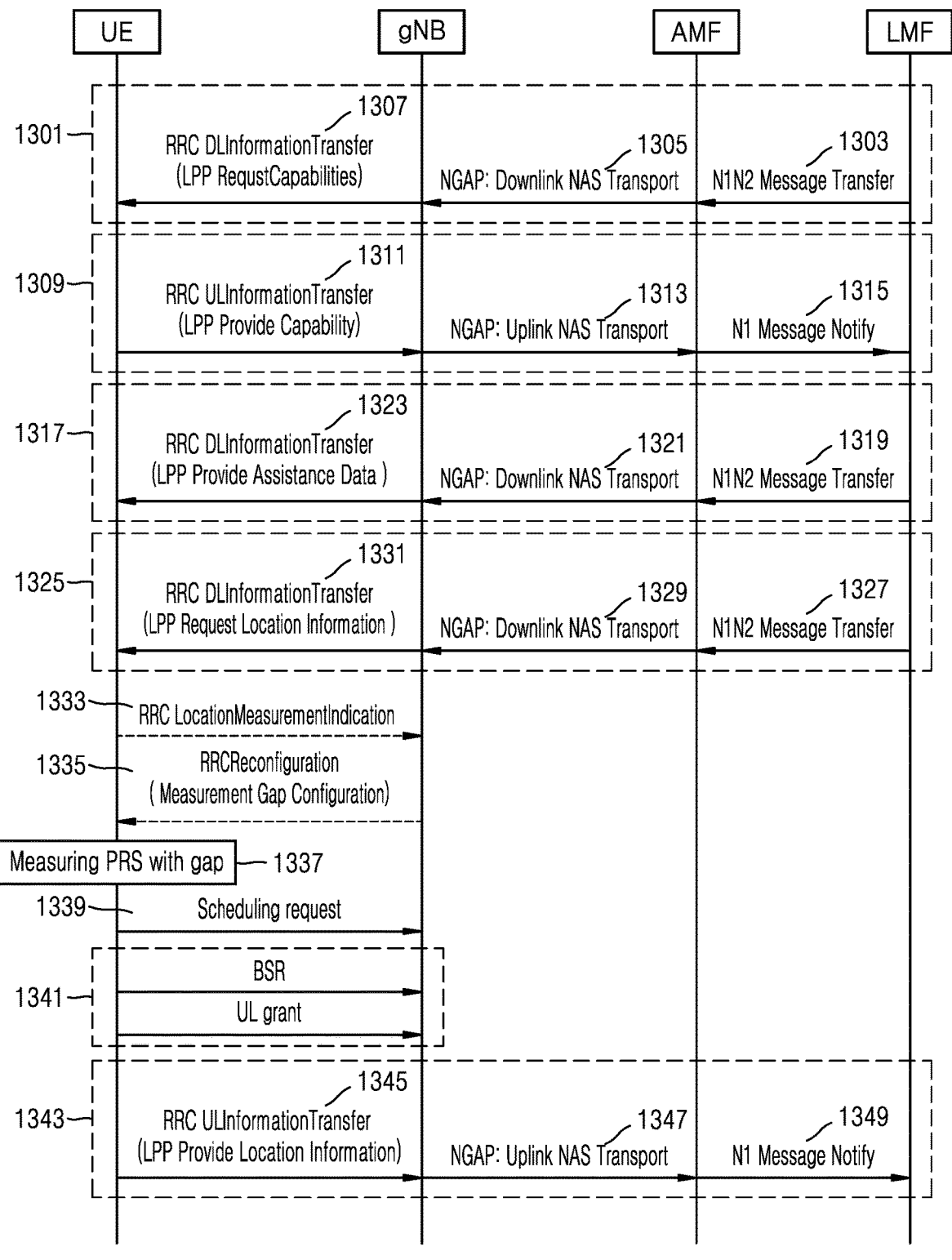
FIG. 13 is a diagram illustrating an operation for position measurement when an uplink (UL) resource is not allocated.

FIG. 13 is a diagram illustrating an operation for position measurement when a UL resource is not allocated.

In operation 1301, a UE receives a capacity information request from an LMF, and in operation 1309, the UE transmits, to the LMF, information associated with a position measurement capability of the UE. Here, the LMF and the UE perform communication by using an LPP. That is, in operation 1303, when the LMF transfers a LPP Request Capabilities message to an access and AMF, the LMF may use a NIN2 message transfer message, and when the AMF receives the message, the AMF may extract the LPP Request Capabilities message from the NIN2 message transfer message. The AMF includes the LPP Request Capabilities message in a downlink NAS transport message and transfers the message to a BS associated with a target UE. The BS includes the message in an RRC DLInformationTransfer message and transfers the message to the UE.

In a case where the UE transfers the information associated with the position measurement capability to the LMF, in operation 1311, when the UE includes an LPP Provide Capability message associated with the position measurement capability in an RRC ULInformation Transfer message and transfers the message to the BS, the BS extracts the LPP Provide Capability message from the RRC ULInformation Transfer message. In operation 1313, the BS includes the LPP Provide Capability message in an Uplink NAS transport message, and transfers the message to the AMF. In operation 1315, the AMF includes the LPP Provide Capability message in an NI message notify message and transfers the message to the LMF.

In operation 1317, the LMF receives the information associated with the position measurement capability of the target UE and transfers position measurement assistance information to the UE. Here, in operation 1319, the LMF includes a LPP ProvideAssistanceData message in a NIN2 message and transfers the message to the AMF, and in operation 1321, the AMF receives the message, extracts and includes the LPP ProvideAssistanceData message in a DownlinkNASTransport message, and transfers the message to the BS. In operation 1323, the BS includes the LPP ProvideAssistanceData message in an RRC DLInformationTransfer message and transfers the message to the UE. When the UE receives the message, the UE identifies a frequency and transmission time of a PRS to be measured, information about association with a TRP of each PRS, and configuration information of each PRS resource and resource set. The LPP ProvideAssistanceData message may include information associated with DL PRS resource configuration, and may include information about an entire PRS transmission situation.

Afterward, in operation 1325, the LMF may request a position measurement indication via a specific position measurement method. Position measurement indication information is included in a LPP RequestLocationInformation message and is transferred to the UE via the AMF/the BS in operations 1327, 1329, and 1331. Here, messages to be encapsulated are the same as used to transmit the LPP provide Assistance Data message. The LPP RequestLocationInformation message may include Common field and method specific fields, and for example, may include information as to whether to report a measured DL PRS resource ID (DL PRS resource id measured), and the like. The UE may determine how to measure a position and what to report to the BS, based on the LPP RequestLocationInformation in a given PRS situation. The UE may identify a current NR/EUTRA measurement state, based on the LPP RequestLocationInformation message, and may determine whether a measurement gap (MG) is requested within a capacity of the UE.

In operation 1333, the UE having received this information compares the information with measurement configuration information that is currently maintained and operated, and when a capability of the UE which is requested for PRS measurement is insufficient, the UE requests the BS for a measurement gap. This request is transferred to the BS via an RRC Location MeasurementIndication message. The RRC Location MeasurementIndication message may include information indicating whether a RAT to be measured is EUTRA or NR, frequency and PRS location information of each of cases where the RAT to be measured is NR and the RAT to be measures is EUTRA, or information indicating whether it is EUTRA fine detection.

In operation 1335, the BS may detect the request and may configure the UE with a necessary measurement gap. Here, information transferred as measurement gap configuration may be gap length information, repetition period information, timing advance information, cell for timing ref information, and gap offset (i.e., a starting subframe of a gap window may be indicated) information.

In operation 1337, the UE having received this information measures a given PRS during a defined measurement gap period, and when a measurement result is available, the UE includes and transfers the measurement result in a LPP Provide LocationInformation message to the BS. Here, the UE includes and transfers the LPP message in an RRC ULInformationTransfer message. In operation 1343, the message is transferred to the LMF via the AMF, by using an interface and an encapsulation message which are the same as an existing LPP Provide Capability.

In this case, a UL resource for transferring a measurement value may not exist. To this end, in operation 1339, the UE may request the BS for resource allocation, via a scheduling request, and after reception of a UL resource, in operation 1341, the UE may transfer an LPP measurement result to the BS only after the UE receives a UL resource by transmitting a buffer status report (BSR) to the BS.

According to an embodiment of the present disclosure, the UE may decrease an obtainment period of a resource requested for the UE to transmit an LPP measurement result to the BS.

Figure 14:
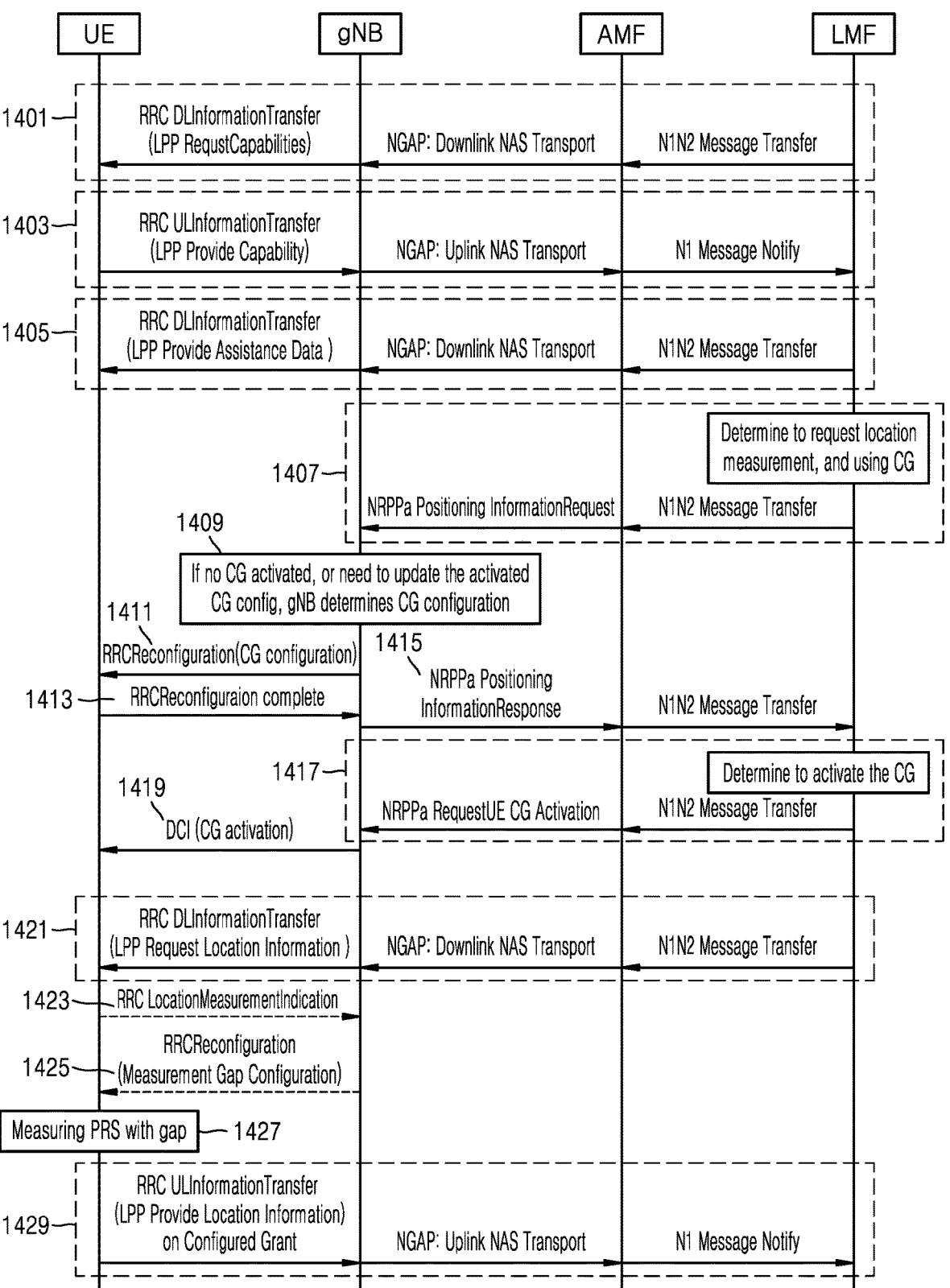
FIG. 14 is a diagram illustrating a position measurement procedure according to a configured UL resource grant provision method according to an embodiment of the present disclosure.

FIG. 14 is a diagram illustrating a position measurement procedure according to a configured UL resource grant provision method according to an embodiment of the present disclosure.

Here, a case of using configured grant type 2 is assumed, which corresponds to a case where an LMF transfers requested periodicity information to a BS. In a case where a UE is configured with Configured grant type 2, the UE may transmit a UL resource by using the uplink grant when the BS activates uplink grant via DCI, whereas, in a case where the UE is configured with configured grant type 1, the UE may directly transmit a UL resource without activation by the BS. A case where the UE uses configured grant type 1 will be described below with reference to FIG. 15.

In this case, messages and an interface of a procedure in which the UE receives a LPP RequestCapabilities message from the LMF, responses to the LMF with respect to the reception, and receives LPP ProvideAssistanceData are the same as the case of FIG. 13. That is, operations 1401, 1403, and 1405 of FIG. 14 may correspond to operations 1301, 1309, and 1317 of FIG. 13.

In operation 1407, in addition to a transfer of the LPP RequestCapabilities message and the LPP ProvideAssistanceData message, the LMF may indicate a request of configured grant configuration for positioning in a new NRPPa message or a Positioning InformationRequest message for the BS. This message may additionally include information such as required latency information necessary for a positioning method corresponding thereto or (maximum) periodicity of UL grant proposed/requested by the LMF. A serving node having received the information may configure CG periodicity to which the information is applied. Also, the message may include an identifier for CG type 2 or CG Type 1, such that, when the BS receives the message, the BS may configure CG type, based on the identifier.

In operation 1409, the BS having received the message may configure periodicity of CG by considering the requested UL grant periodicity and required latency information, and may configure a type of the CG. In operation 1411, the BS may perform configuration of the CG via an RRC message.

The UE having received the message may configure the CG with the indicated CG type. FIG. 14 illustrates a case of CG type 2, and in the case of CG type 2, in operation 1413, when the UE transmits an RRCReconfigurationComplete message to the BS, in operation 1415, the BS may transmit an NRPPa PositioningInformationResponse message to the LMF. The NRPPa PositioningInformationResponse message may include a CG configuration completion indicator and/or configured CG UL periodicity. The LMF may identify that desired CG is configured for the UE. Afterward, when the LMF attempts to activate CG configured as CG type 2, in operation 1417, the LMF may indicate activation of the CG to the BS via an NRPPa message. In operation 1419, the BS having received the message may command, via DCI, the UE to activate CG of the UE. The UE having received the command activates the CG at that time. When the BS activates CG, the BS may use DCI, and when ack of success in a transfer of a PDCCH including the DCI is received, the BS may transfer, to the LMF, a response message with respect to activation of the CG in the NRPPa message.

Afterward, in operation 1421, the LMF may transfer an LPP RequestLocationInformation message to the UE, thereby requesting the UE for measurement according to a specific position measurement scheme.

Upon reception of the request, in operation 1423, the UE may compare its measurement capability with measurement configuration information that is currently maintained and operated, and when UE capability requested for PRS measurement is insufficient, the UE may request the BS for a measurement gap. This request may be transferred via an RRC Location MeasurementIndication message to the BS. In operation 1425, the BS may configure the UE with a requested measurement gap via an RRCReconfiguration message, in response to the measurement gap request.

In operation 1427, in a case where the UE performs measurement and a result thereof is available, in operation 1429, the UE may include the result in LPP ProvideLocationInformation, may include the LPP ProvideLocationInformation in an RRC ULInformation Transfer message and may transfer the message to the BS. Here, the UE may transmit UL data to the BS by using configured CG. The BS having received the LPP ProvideLocationInformation may transfer it to the LMF.

Figure 15:
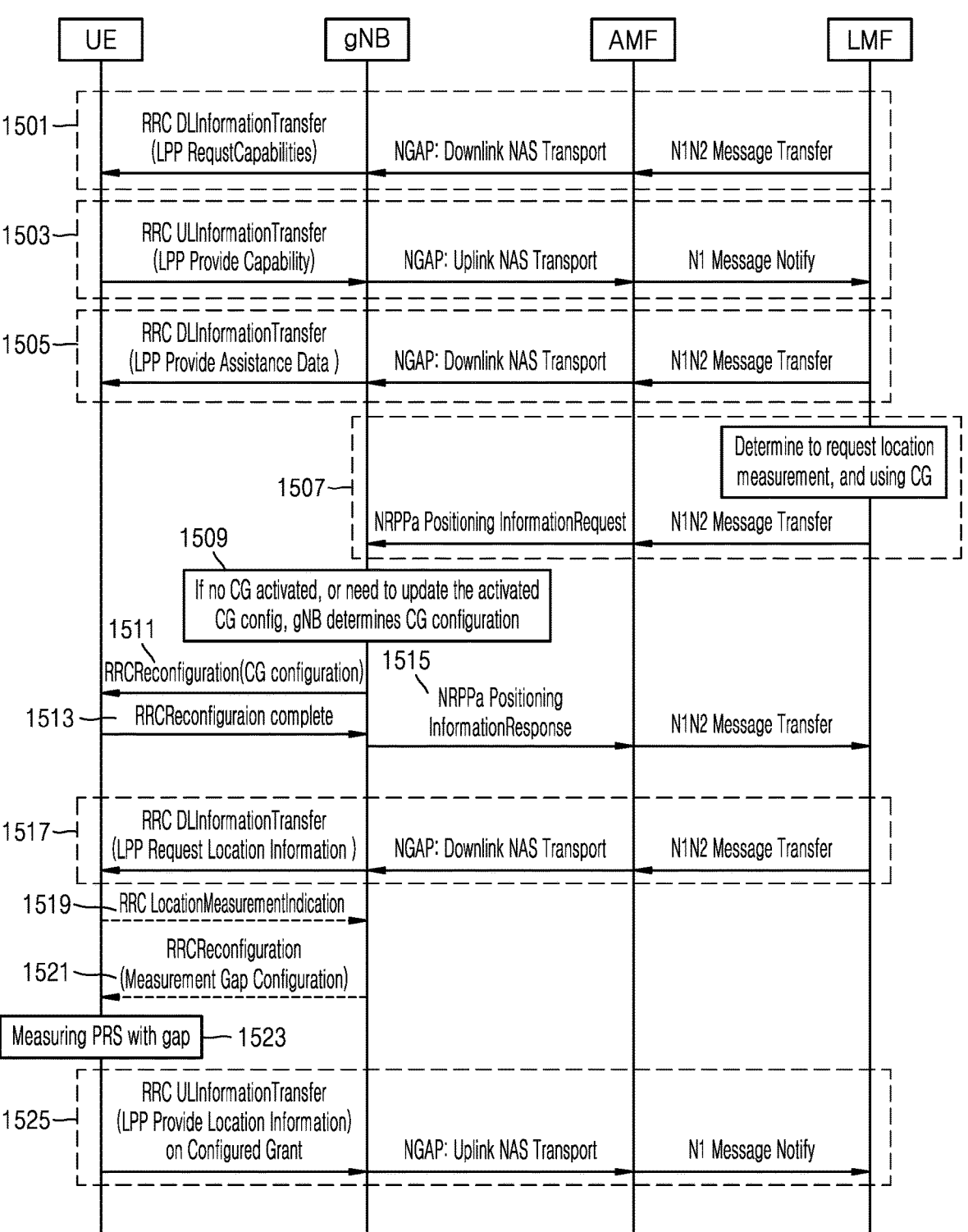
FIG. 15 is a diagram illustrating position measurement according to a configured UL resource grant provision method according to another embodiment of the present disclosure.

FIG. 15 is a diagram illustrating position measurement according to a configured UL resource grant provision method according to another embodiment of the present disclosure.

Here, a case of using configured grant type 1 is assumed, which corresponds to a case where an LMF transfers requested periodicity information to a BS.

Operations until the UE receives an LPP ProvideAssistance Data message are equal to operations and transfer of messages of FIG. 14. Operations 1501 to 1505 of FIG. 15 may correspond to operations 1401 to 1405 of FIG. 14.

In operation 1507, in addition to a transfer of an LPP RequestCapabilities message and the LPP ProvideAssistanceData message, the LMF may indicate a request of configured grant configuration for positioning in a new NRPPa message or a Positioning InformationRequest message for the BS. This message may additionally include information such as required latency information necessary for a positioning method corresponding thereto or (maximum) periodicity of UL grant proposed/requested by the LMF. A serving node having received the information may configure CG periodicity to which the information is applied. Also, the message may include an identifier for CG type 2 or CG Type 1, such that, when the BS receives the message, the BS may configure CG type, based on the identifier.

In operation 1509, the BS having received the message may configure periodicity of CG by considering the requested UL grant periodicity and required latency information, and may configure a type of the CG. In operation 1511, the BS may perform configuration of the CG via an RRC message.

The UE having received the message may configure the CG with the indicated CG type. FIG. 15 illustrates a case of CG type 1, and in the case of CG type 1, in operation 1513, when the UE transmits an RRCReconfigurationComplete message to the BS, in operation 1515, the BS may transmit an NRPPa PositioningInformationResponse message to the LMF. The NRPPa PositioningInformationResponse message may include a CG configuration completion indicator and/or configured CG UL periodicity. The LMF may identify that desired CG is configured for the UE.

When the UE is configured with the type 1 CG, the UE may apply the CG at that time.

Afterward, in operation 1517, the LMF may transfer an LPP RequestLocationInformation message to the UE, thereby requesting the UE for measurement according to a specific position measurement scheme.

Upon reception of the request, in operation 1519, the UE may compare its measurement capability with measurement configuration information that is currently maintained and operated, and when UE capability requested for PRS measurement is insufficient, the UE may request the BS for a measurement gap. This request may be transferred via an RRC Location MeasurementIndication message to the BS. In operation 1521, the BS may configure the UE with a requested measurement gap via an RRCReconfiguration message, in response to the measurement gap request.

In operation 1523, in a case where the UE performs measurement and a result thereof is available, in operation 1525, the UE may include the result in LPP ProvideLocationInformation, may include the LPP ProvideLocationInformation in an RRC ULInformationTransfer message and may transfer the message to the BS. Here, the UE may transmit UL data by using configured CG. The BS having received the LPP ProvideLocationInformation may transfer it to the LMF.

Figure 16:
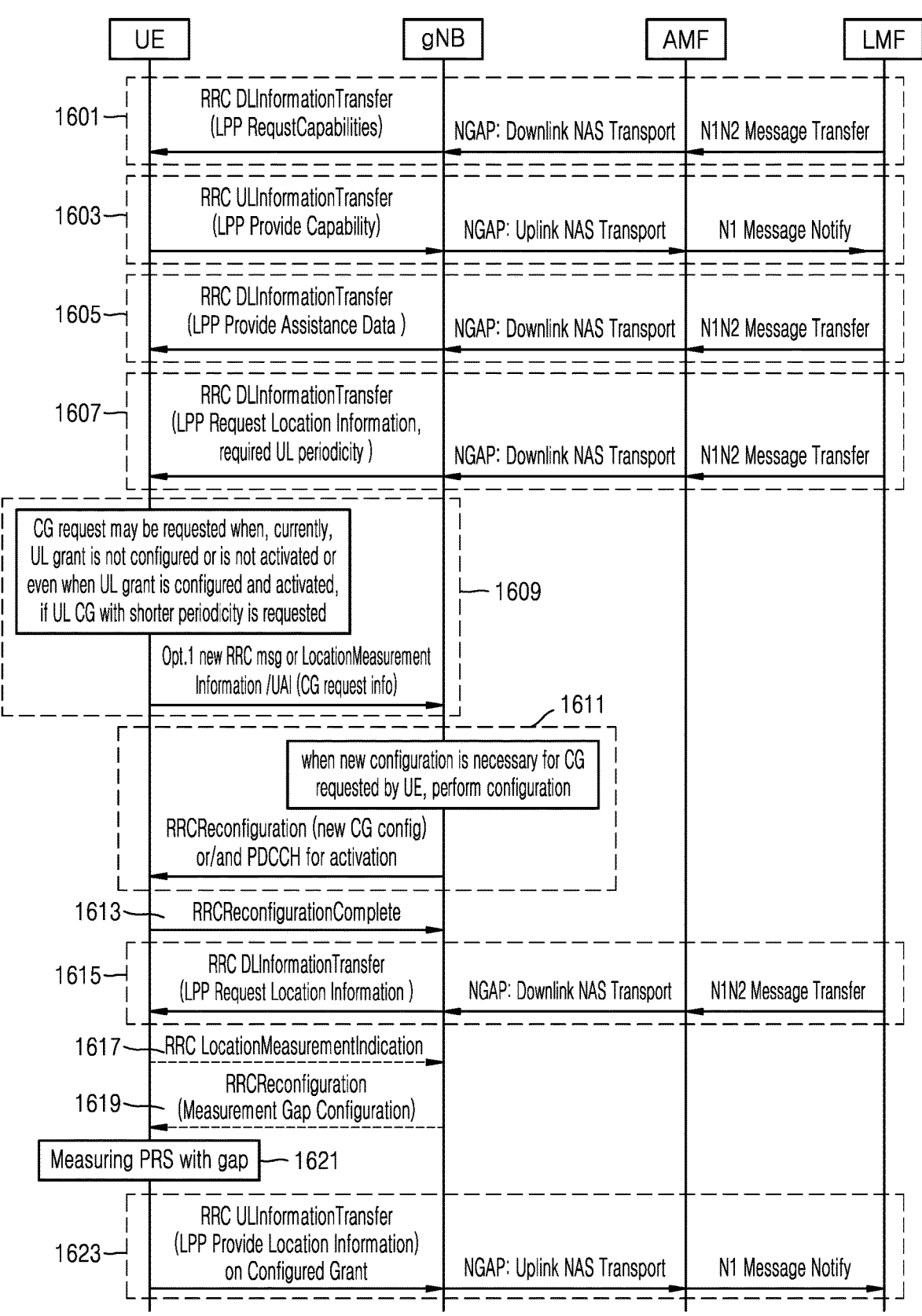
FIG. 16 is a diagram illustrating a position measurement procedure according to a configured UL resource grant provision method according to another embodiment of the present disclosure.

FIG. 16 is a diagram illustrating a position measurement procedure according to a configured UL resource grant provision method according to another embodiment of the present disclosure.

Provided is a case where an LMF transfers necessary periodicity information to a UE via an LPP message, and the UE requests a BS for necessary configured grant. The request of the UE in this case corresponds to a case of using an RRC message.

Operations until the UE receives an LPP ProvideAssistance Data message are equal to operations and transfer of messages of FIG. 14. Operations 1601 to 1605 of FIG. 16 may correspond to operations 1401 to 1405 of FIG. 14.

Afterward, in operation 1607, the LMF transmits an LPP RequestLocationInformation message to the UE. This message may include an indicator requesting CG configuration, and may additionally include information such as required latency information necessary for a positioning method corresponding thereto or (maximum) periodicity of UL grant proposed/requested by the LMF.

In operation 1609, the UE having received the information may request the BS for a CG request when, currently, UL grant is not configured or is not activated or even when UL grant is configured and activated, if UL CG with shorter periodicity is requested. To this end, a new RRC message or existing LocationMeasurementInformation or UEAssistanceInformation message may be used. The message may include UL periodicity or CG periodicity value which is requested by the UE. When the RRC message is used, the UE may request shortest periodicity for currently-requested UL transmission periodicity, in consideration of periodicities with respect to multiple positioning methods and currently-requested UL periodicity.

In operation 1611, the BS having received the information may newly transmit, to the UE, CG configuration via an RRC Reconfiguration message when new configuration is necessary for CG requested by the UE. In this case, when it is CG type 2, CG activation using DCI of a PDCCH may be possible after additionally an RRCReconfiguration complete message is received, and when it is CG type 1, the UE may immediately apply CG after the UE receives the RRC Reconfiguration message including CG configuration.

In operation 1613, the UE may transmit an RRCReconfigurationComplete message to the BS.

Afterward, in operation 1615, the LMF may transfer an LPP RequestLocationInformation message to the UE, thereby requesting the UE for measurement according to a specific position measurement scheme. Upon reception of the request, in operation 1617, the UE may compare its measurement capability with measurement configuration information that is currently maintained and operated, and when UE capability requested for PRS measurement is insufficient, the UE may request the BS for a measurement gap. This request may be transferred via an RRC Location MeasurementIndication message to the BS. In operation 1619, the BS may configure the UE with a requested measurement gap via an RRCReconfiguration message, in response to the measurement gap request.

In operation 1621, in a case where the UE performs measurement and a result thereof is available, in operation 1623, the UE may include the result in LPP ProvideLocationInformation, may include the LPP ProvideLocationInformation in an RRC ULInformation Transfer message and may transfer the message to the BS. Here, the UE may transmit UL data by using configured CG. The BS having received the LPP ProvideLocationInformation may transfer it to the LMF.

Figure 17:
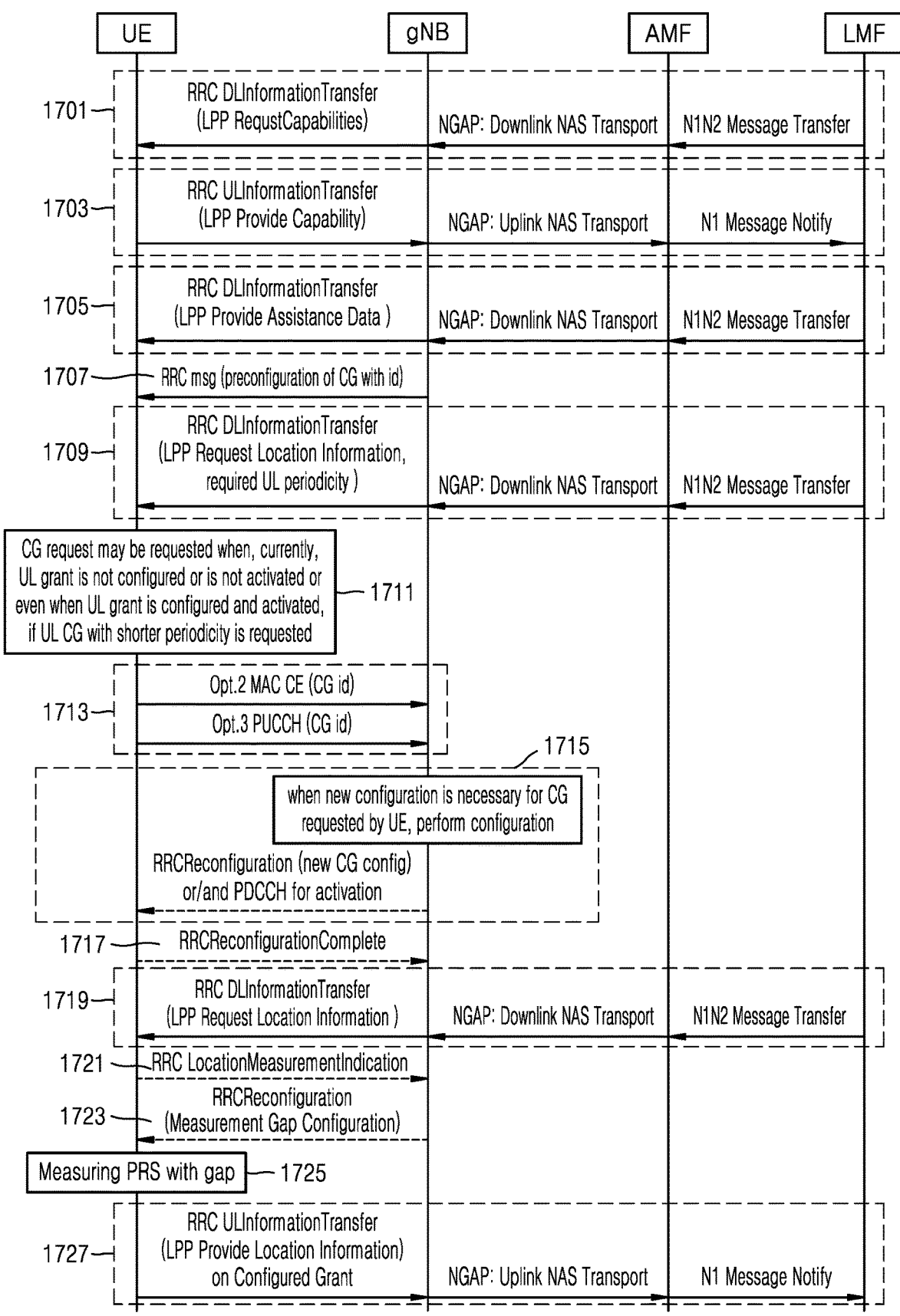
FIG. 17 is a diagram illustrating position measurement according to a configured UL resource grant provision method according to another embodiment of the present disclosure.

FIG. 17 is a diagram illustrating position measurement according to a configured UL resource grant provision method according to an embodiment of the present disclosure.

Provided is a case where an LMF transfers necessary periodicity information to a UE via an LPP message, and the UE requests a BS for necessary configured grant. The request of the UE in this case corresponds to a case of using a signal of an MAC or PHY layer.

Operations until the UE receives an LPP ProvideAssistance Data message are equal to operations and transfer of messages of FIG. 14. Operations 1701 to 1705 of FIG. 17 may correspond to operations 1401 to 1405 of FIG. 14.

Afterward, in operation 1707, the BS may provide pre-configuration to the UE by associating CG with the ID.

Afterward, in operation 1709, the LMF may transmit an LPP RequestLocationInformation message to the UE. This message may include an indicator requesting CG configuration, and may additionally include information such as required latency information necessary for a positioning method corresponding thereto or (maximum) periodicity of UL grant proposed/requested by the LMF.

In operation 1711, the UE having received the information may request a CG request when, currently, UL grant is not configured or is not activated or even when UL grant is configured and activated, if UL CG with shorter periodicity is requested. To this end, the UE may select UE-requested CG from among CGs pre-configured via an RRC message, and may inform the selected CG to the BS. In operation 1713, the UE may transfer an ID of desired CG to the BS via an MAC CE or uplink control information (UCI) of a physical uplink control channel (PUCCH).

In operation 1715, the BS having received the information may newly transmit, to the UE, CG configuration via an RRC Reconfiguration message when new configuration is necessary for CG requested by the UE. In this case, when it is CG type 2, CG activation using DCI of a PDCCH may be possible after additionally an RRCReconfiguration complete message is received, and when it is CG type 1, the UE may immediately apply CG after the UE receives the RRC Reconfiguration message including CG configuration.

In operation 1717, the UE may transmit an RRCReconfigurationComplete message to the BS.

Afterward, in operation 1719, the LMF may transfer an LPP RequestLocationInformation message to the UE, thereby requesting the UE for measurement according to a specific position measurement scheme. Upon reception of the request, in operation 1721, the UE may compare its measurement capability with measurement configuration information that is currently maintained and operated, and when UE capability requested for PRS measurement is insufficient, the UE may request the BS for a measurement gap. This request may be transferred via an RRC Location MeasurementIndication message to the BS. In operation 1723, the BS may configure the UE with a requested measurement gap via an RRCReconfiguration message, in response to the measurement gap request.

In operation 1725, in a case where the UE performs measurement and a result thereof is available, in operation 1727, the UE may include the result in LPP ProvideLocationInformation, may include the LPP ProvideLocationInformation in an RRC ULInformation Transfer message and may transfer the message to the BS. Here, the UE may transmit UL data by using configured CG. The BS having received the LPP ProvideLocationInformation may transfer it to the LMF.

In another case, the UE may perform reporting on CG to be used in UL transmission by the UE from among pre-defined CGs, instead of an ID of requested CG via a MAC CE or PUCCH UCI. That is, the ID of the CG included in the MAC CE or PUCCH UCI indicates CG the UE determines to use, and in this case, it is not necessary for the BS to newly configure CG additionally via RRCReconfiguration.

In each of the embodiments above, in cases where the BS performs CG configuration, i.e., in cases of operation 1411, operation 1511, operation 1611, and operation 1715, the CG configuration and a logical channel ID to be transmitted by using the CG may be associated and indicated in a corresponding RRC message. The UE having received the message may use the associated CG when the UE transmits UL data by using the logical channel. In another embodiment, association between the CG and the logical channel ID may additionally include an indicator indicating that it is CG for transmission of a position measurement result. The UE having received the message may use a logical channel indicated by an ID for transmission of the position measurement result, and when UL data of the logical channel occurs, the UE may use the associated CG.

Figure 18:
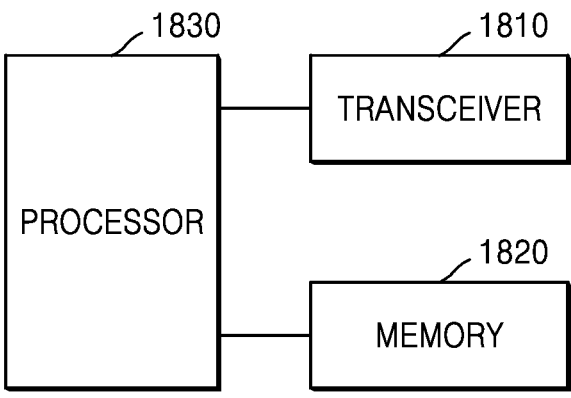
FIG. 18 is a block diagram illustrating a structure of a UE according to an embodiment of the present disclosure.

FIG. 18 is a block diagram illustrating a structure of a UE according to an embodiment of the present disclosure.

As illustrated in FIG. 18, the UE may include a transceiver 1810, a memory 1820, and a processor 1830. According to the communication method of the UE described above, the processor 1830, the transceiver 1810 and the memory 1820 of the UE may operate. However, elements of the UE are not limited to the example above. For example, the UE may include more elements than those described above or may include fewer elements than those described above. In addition, the processor 1830, the transceiver 1810 and the memory 1820 may be implemented as one chip.

The transceiver 1810 collectively refers to a receiver of the UE and a transmitter of the UE, and may transmit or receive signals to or from a BS or a network entity. The signals being transmitted or received to or from the BS may include control information and data. To this end, the transceiver 1810 may include a RF transmitter for up-converting and amplifying a frequency of signals to be transmitted, and an RF receiver for low-noise-amplifying and down-converting a frequency of received signals. However, this is merely an example of the transceiver 1810, and elements of the transceiver 1810 are not limited to the RF transmitter and the RF receiver.

Also, the transceiver 1810 may include a wired/wireless transceiver, and may include various configurations for transmitting and receiving signals.

Also, the transceiver 1810 may receive signals via wired/wireless channels and output the signals to the processor 1830, and may transmit signals output from the processor 1830, via wired/wireless channels.

Also, the transceiver 1810 may receive and output a communication signal to the processor, and may transmit a signal output from the processor to the network entity via a wired/wireless network.

The memory 1820 may store programs and data required for the UE to operate. Also, the memory 1820 may store control information or data included in a signal obtained by the UE. The memory 1820 may include any or a combination of storage media such as ROM, RAM, a hard disk, a compact disc (CD)-ROM, a digital versatile disc (DVD), or the like.

Also, the processor 1830 may control a series of processes to allow the UE to operate according to the embodiments of the present disclosure. Also, the processor 1830 may include one or more processors. For example, the processor 1830 may include a communication processor (CP) for controlling communications and an application processor (AP) for controlling an upper layer such as an application program.

Figure 19:
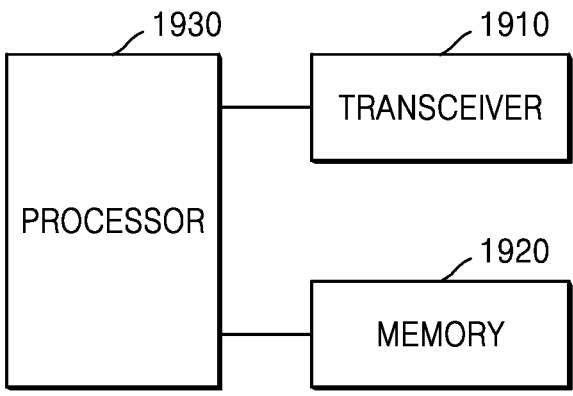
FIG. 19 is a block diagram illustrating a structure of a BS according to an embodiment of the present disclosure.

FIG. 19 is a block diagram illustrating a structure of a BS according to an embodiment of the present disclosure.

As illustrated in FIG. 19, the BS may include a transceiver 1910, a memory 1920, and a processor 1930. According to the communication method of the BS described above, the processor 1930, the transceiver 1910 and the memory 1920 of the BS may operate. However, elements of the BS are not limited to the example above. For example, the BS may include more elements than those described above or may include fewer elements than those described above. In addition, the processor 1930, the transceiver 1910 and the memory 1920 may be implemented as one chip.

The transceiver 1910 collectively refers to a receiver of the BS and a transmitter of the BS, and may transmit or receive signals to or from a UE or another BS. The signals being transmitted or received may include control information and data. To this end, the transceiver 1910 may include a RF transmitter for up-converting and amplifying a frequency of signals to be transmitted, and an RF receiver for low-noise-amplifying and down-converting a frequency of received signals. However, this is merely an example of the transceiver 1910, and elements of the transceiver 1910 are not limited to the RF transmitter and the RF receiver. Also, the transceiver 1910 may include a wired/wireless transceiver, and may include various configurations for transmitting and receiving signals.

Also, the transceiver 1910 may receive signals via communication channels (e.g., wireless channels) and output the signals to the processor 1930, and may transmit signals output from the processor 1930, via communication channels.

Also, the transceiver 1810 may receive and output a communication signal to the processor, and may transmit a signal output from the processor to the UE or the network entity via a wired/wireless network.

The memory 1920 may store programs and data required for the BS to operate. Also, the memory 1920 may store control information or data included in a signal obtained by the BS. The memory 1920 may include any or a combination of storage media such as ROM, RAM, a hard disk, a CD-ROM, a DVD, or the like.

Also, the processor 1930 may control a series of processes to allow the BS to operate according to the embodiments of the present disclosure. Also, the processor 1930 may include one or more processors. The methods according to the embodiments of the present disclosure as described herein or in the following claims may be implemented as hardware, software, or a combination of hardware and software.

According to an embodiment of the present disclosure, a method performed by a BS in a wireless communication system may be provided. The method may include: configuring a plurality of measurement gaps for a UE; and performing a measurement gap activation procedure via a DL MAC CE, based on the plurality of measurement gaps.

According to an embodiment, the method may further include receiving PRS configuration information via an NRPPa message from an LMF entity.

According to an embodiment, the configuring of the plurality of measurement gaps may include: allocating a plurality of identifiers respectively corresponding to the plurality of measurement gaps; and transmitting, to the UE, information about the plurality of measurement gaps associated with the plurality of identifiers.

According to an embodiment, the method may further include receiving position measurement indication information from the UE.

According to an embodiment, the performing of the measurement gap activation procedure may include: configuring a measurement gap, based on the position measurement indication information; and transmitting, to the UE, information indicating an identifier corresponding to the measurement gap.

According to an embodiment, the identifier may be determined from among a plurality of identifiers respectively corresponding to the plurality of measurement gaps.

According to an embodiment of the present disclosure, a method performed by a UE in a wireless communication system may be provided. The method may include: identifying configuration information about a plurality of measurement gaps; and requesting a BS for activation of a measurement gap via a UL MAC CE, based on the configuration information.

According to an embodiment, the identifying may include receiving, from the BS, information about the plurality of measurement gaps associated with a plurality of identifiers.

According to an embodiment, the requesting of the activation of the measurement gap may include: when a position measurement request message is received from the BS, determining a first measurement gap from among the plurality of measurement gaps; and transmitting, to the BS, information indicating a first identifier corresponding to the first measurement gap.

According to an embodiment, the method may further include receiving, from the BS, information indicating a second identifier corresponding to a second measurement gap determined from among the plurality of measurement gaps.

According to an embodiment, the method may further include activating the first measurement gap when the first identifier and the second identifier are equal, and activating the second measurement gap when the first identifier and the second identifier are different.

According to an embodiment, the configuration information may be configured based on PRS configuration information transmitted from an LMF entity via an NRPPa message.

According to an embodiment of the present disclosure, a method performed by a BS in a wireless communication system may be provided. The method may include: receiving information for requesting measurement gap activation via an NRPPa message from an LMF entity; and performing a procedure for the measurement gap activation, based on the NRPPa message.

According to an embodiment, the performing of the procedure for the measurement gap activation may include: configuring a measurement gap, based on the information for requesting measurement gap activation; and transmitting the information for requesting measurement gap activation to a UE.

According to an embodiment of the present disclosure, a BS in a wireless communication system may be provided. The BS may include a transceiver; and at least one processor configured to configure a plurality of measurement gaps for a UE, and perform, via the transceiver, a measurement gap activation procedure via a DL MAC CE, based on the plurality of measurement gaps.

According to an embodiment of the present disclosure, a UE in a wireless communication system may be provided. The UE may include a transceiver; and at least one processor configured to identify configuration information about a plurality of measurement gaps, and request, via the transceiver, a BS for activation of a measurement gap via a UL MAC CE, based on the configuration information.

According to an embodiment of the present disclosure, a BS in a wireless communication system may be provided. The BS may include a transceiver; and at least one processor configured to receive, via the transceiver, information for requesting measurement gap activation via an NRPPa message from an LMF entity, and perform a procedure for the measurement gap activation, based on the NRPPa message.

The methods according to the embodiments of the present disclosure as described herein or in the following claims may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments of the present disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. Also, a plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the present disclosure. Furthermore, a separate storage device on the communication network may access the electronic device performing the embodiments of the present disclosure.

In the afore-described embodiments of the present disclosure, configuration elements included in the present disclosure are expressed in a singular or plural form according to the embodiments of the present disclosure. However, the singular or plural form is appropriately selected for convenience of descriptions and the present disclosure is not limited thereto. As such, a configuration element expressed in a plural form may also be configured as a single element, and a configuration element expressed in a singular form may also be configured as plural elements.

Specific embodiments are described in the descriptions of the present disclosure, but it will be understood that various modifications may be made without departing the scope of the present disclosure. Thus, the scope of the present disclosure is not limited to the embodiments described herein and should be defined by the appended claims and their equivalents. In other words, it will be apparent to one of ordinary skill in the art that other modifications based on the technical ideas of the present disclosure are feasible. Also, the embodiments may be combined with each other as required. For example, portions of the methods provided by the present disclosure may be combined with each other to enable the BS and the UE to operate. Also, although the embodiments of the present disclosure are described based on 5G and NR systems, modifications based on the technical scope of the embodiments of the present disclosure may be applied to other communication systems such as LTE, LTE-A, LTE-A-Pro systems, or the like.

The invention claimed is:

1. A method performed by a base station in a wireless communication system, the method comprising:
   receiving, from a location management function (LMF) entity, an NR positioning protocol A (NRPPa) message including positioning reference signal (PRS) information associated with one or more neighbor transmission and reception points (TRPs);
   transmitting, to a user equipment (UE), a radio resource control (RRC) reconfiguration message including one or more measurement gap configurations with one or more associated identifiers (IDs);
   receiving, from the UE via an uplink (UL) medium access control (MAC) control element (CE), a measurement gap activation request indicating a requested measurement gap based on the one or more associated IDs; and
   based on the measurement gap activation request, transmitting, to the UE via a downlink (DL) MAC CE, information including an ID to activate a measurement gap.

2. The method of claim 1, further comprising:
   determining the one or more measurement gap configurations with the one or more associated IDs, based on the NRPPa message,
   wherein the one or more measurement gap configurations are for positioning.

3. The method of claim 2, further comprising:
   receiving, from the UE, a provide location information message including measurement result information; and
   transmitting, to the LMF entity, the provide location information message.

4. A method performed by a user equipment (UE) in a wireless communication system, the method comprising:
   receiving, from a base station, a radio resource control (RRC) reconfiguration message including one or more measurement gap configurations with one or more associated identifiers (IDs);
   transmitting, to the base station via an uplink (UL) medium access control (MAC) control element (CE), a measurement gap activation request indicating a requested measurement gap based on the one or more associated IDs; and
   receiving, from the base station via a downlink (DL) MAC CE, information including an ID to activate a measurement gap.

5. The method of claim 4, further comprising:
   performing a measurement based on the ID to active the measurement gap; and
   transmitting, to a location management function (LMF) entity via the base station, a provide location information message including measurement result information,
   wherein the one or more measurement gap configurations are for positioning.

6. The method of claim 5, wherein the one or more measurement gap configurations with the one or more associated IDs are associated with an NR positioning protocol A (NRPPa) message including positioning reference signal (PRS) information associated with one or more neighbor transmission and reception points (TRPs).

7. A base station in a wireless communication system, the base station comprising:

at least one transceiver;

at least one processor communicatively coupled to the at least one transceiver; and at least one memory communicatively coupled to the at least one processor, storing instructions executable by the at least one processor to cause the base station to:

receive, from a location management function (LMF) entity, an NR positioning protocol A (NRPPa) message including positioning reference signal (PRS) information associated with one or more neighbor transmission and reception points (TRPs), transmit, to a user equipment (UE), a radio resource control (RRC) reconfiguration message including one or more measurement gap configurations with one or more associated identifiers (IDs), receive, from the UE via an uplink (UL) medium access control (MAC) control element (CE), a measurement gap activation request indicating a requested measurement gap based on the one or more associated IDs, and based on the measurement gap activation request, transmitting, to the UE via a downlink (DL) MAC CE, information including an ID to activate a measurement gap.

8. The base station of claim 7, wherein the base station is further caused to:

determine the one or more measurement gap configurations with the one or more associated IDs, based on the NRPPa message, wherein the one or more measurement gap configurations are for positioning.

9. The base station of claim 8, wherein the base station is further caused to:

receive, from the UE, a provide location information message including measurement result information; and transmit, to the LMF entity, the provide location information message.

10. A user equipment (UE) in a wireless communication system, the UE comprising:

at least one transceiver;

at least one processor communicatively coupled to the at least one transceiver; and at least one memory communicatively coupled to the at least one processor, storing instructions executable by the at least one processor to cause the UE to:

receive, from a base station, a radio resource control (RRC) reconfiguration message including one or more measurement gap configurations with one or more associated identifiers (IDs), transmit, to the base station via an uplink (UL) medium access control (MAC) control element (CE), a measurement gap activation request indicating a requested measurement gap based on the one or more associated IDs, and receive, from the base station via a downlink (DL) MAC CE, information including an ID to activate a measurement gap.

11. The UE of claim 10, wherein the UE is further caused to:

perform a measurement based on the ID to active the measurement gap; and transmit, to a location management function (LMF) entity via the base station, a provide location information message including measurement result information, wherein the one or more measurement gap configurations are for positioning.

12. The UE of claim 11, wherein the one or more measurement gap configurations with the one or more associated IDs are associated with an NR positioning protocol A (NRPPa) message including positioning reference signal (PRS) information associated with one or more neighbor transmission and reception points (TRPs).

* * * * *